US012334041B2

(12) United States Patent
Takasaki et al.

(10) Patent No.: US 12,334,041 B2
(45) Date of Patent: Jun. 17, 2025

(54) ELECTRONIC PERCUSSION INSTRUMENT AND METHOD OF DETECTING PERCUSSION POSITION

(71) Applicant: Roland Corporation, Shizuoka (JP)

(72) Inventors: Ryo Takasaki, Shizuoka (JP); Shun Takai, Shizuoka (JP)

(73) Assignee: Roland Corporation, Shizuoka (JP)

( * ) Notice: Subject to any disclaimer, the term of this patent is extended or adjusted under 35 U.S.C. 154(b) by 886 days.

(21) Appl. No.: 17/321,530

(22) Filed: May 17, 2021

(65) Prior Publication Data

US 2021/0366447 A1 Nov. 25, 2021

(30) Foreign Application Priority Data

May 22, 2020 (JP) ................................ 2020-089576

(51) Int. Cl.

*G10H 1/00* (2006.01)
*G10D 13/02* (2020.01)
*G10D 13/10* (2020.01)
*G10H 1/32* (2006.01)
*G10H 3/14* (2006.01)

(52) U.S. Cl.

CPC .......... *G10H 1/0008* (2013.01); *G10D 13/02* (2013.01); *G10D 13/26* (2020.02); *G10H 1/32* (2013.01); *G10H 3/143* (2013.01); *G10H 2220/161* (2013.01); *G10H 2220/525* (2013.01)

(58) Field of Classification Search

CPC ........ G10H 1/0008; G10H 1/32; G10H 3/143; G10H 2220/161; G10H 2220/525; G10D 13/02; G10D 13/26

See application file for complete search history.

(56) References Cited

U.S. PATENT DOCUMENTS 9,018,510 B2 * 4/2015 Yoshihama .............. G10H 7/00 84/723
10,181,313 B2 * 1/2019 Takasaki ................ G10H 3/146
(Continued)

FOREIGN PATENT DOCUMENTS

CN 103871396 6/2014
CN 109661703 4/2019
(Continued)

OTHER PUBLICATIONS

"Search Report of Europe Counterpart Application", issued on Oct. 29, 2021, pp. 1-5.
(Continued)

*Primary Examiner* — Dedei K Hammond
*Assistant Examiner* — Philip G Scoles
(74) *Attorney, Agent, or Firm* — JCIPRNET

(57) ABSTRACT

An electronic percussion instrument and a method of detecting a percussion position are provided. The percussion position in a left-right direction is calculated by comparing an added-up value of output values of a first edge sensor with an added-up value of output values of a second edge sensor. Compared with a case where peak values of the first and second edge sensors are used, it is possible to make a great difference between an added-up value in a case where the vicinity of the first edge sensor (the second edge sensor) is percussed and an added-up value in a case where a position away from the first edge sensor (the second edge sensor) is percussed.

13 Claims, 11 Drawing Sheets

| percussion position | L2 | L1 | C | R1 | R2 |
|---|---|---|---|---|---|
| waveform | waveformA | waveformA | waveformB | waveformC | waveformC |
| frequency | 230Hz | 480Hz | — | 520Hz | 320Hz |
| Q value | 30 | 30 | — | 30 | 30 |
| Gain | -15dB | +10dB | — | -8dB | +12dB |

(56) References Cited

U.S. PATENT DOCUMENTS

| | | | | |
|---|---|---|---|---|
| 10,255,895 | B2 * | 4/2019 | Takasaki | G10H 3/143 |
| 2015/0090101 | A1 * | 4/2015 | Takasaki | G10H 3/146<br>84/626 |
| 2018/0061388 | A1 * | 3/2018 | Takasaki | G10H 1/32 |

FOREIGN PATENT DOCUMENTS

| | | | | |
|---|---|---|---|---|
| JP | S62501653 | | 7/1987 | |
| JP | 2005037922 | | 2/2005 | |
| JP | 2005037922 | A * | 2/2005 | |
| JP | 2010066659 | A * | 3/2010 | G10H 1/24 |
| JP | 2011158594 | | 8/2011 | |
| JP | 6235198 | B2 * | 11/2017 | |
| JP | 2018036641 | | 3/2018 | |
| WO | 8604718 | | 8/1986 | |
| WO | WO-8604718 | A1 * | 8/1986 | |

OTHER PUBLICATIONS

"Office Action of China Counterpart Application", with English translation thereof, issued on Apr. 4, 2025, pp. 1-14.

* cited by examiner

41 retroactive time t2 / scan time t3

| No. | 1 | 2 | 3 | … | 10 | 11 | … | 50 |
|---|---|---|---|---|---|---|---|---|
| 41a first edge sensor memory | 0.12 | 0.13 | 0.10 | … | 0.42 | 0.45 | … | 0.22 |
| 41b second edge sensor memory | 0.05 | 0.04 | 0.02 | … | 0.10 | 0.11 | … | 0.43 |

| percussion position | L2 | L1 | C | R1 | R2 |
|---|---|---|---|---|---|
| waveform | waveformA | waveformA | waveformB | waveformC | waveformC |
| frequency | 230Hz | 480Hz | — | 520Hz | 320Hz |
| Q value | 30 | 30 | — | 30 | 30 |
| Gain | −15dB | +10dB | — | −8dB | +12dB |

| percussion position | L | R |
|---|---|---|
| waveform | waveform D | waveform E |

ELECTRONIC PERCUSSION INSTRUMENT AND METHOD OF DETECTING PERCUSSION POSITION

CROSS-REFERENCE TO RELATED APPLICATION

This application claims the priority benefit of Japan application serial no. 2020-089576, filed on May 22, 2020. The entirety of the above-mentioned patent applications is hereby incorporated by reference herein and made a part of this specification.

BACKGROUND

Technical Field

The disclosure relates to an electronic percussion instrument and a method of detecting a percussion position, and particularly relates to an electronic percussion instrument and a method of detecting a percussion position which make it possible to improve the accuracy of detection of the percussion position.

Description of Related Art

A technique in which a plurality of sensors that detects a vibration on a percussion surface is provided and a percussion position is detected on the basis of output values of the plurality of sensors is known. For example, Patent Documents 1 and 2 disclose a technique of detecting a percussion position on the basis of a difference or ratio between peak values (peaks of output values) of a pair of sensors. In a case where a position with the same distance from a pair of sensors is percussed, the peak values of the sensors are almost the same as each other, whereas, in a case where the vicinity of any one of the sensors is percussed, the peak value of the sensor close to the percussion position becomes large. Thus, by comparing the peak values of the sensors, it is possible to detect which sensor's vicinity is percussed, that is, a percussion position in the direction of alignment of the pair of sensors.

PATENT DOCUMENTS

[Patent Document 1] PCT Japanese Translation Patent Publication No. S62-501653 (for example, line 10 of the upper left column on page 3 to line 6 of the lower left column on the same page, and FIGS. 1 and 2)

[Patent Document 2] Japanese Patent Laid-Open No. 2011-158594 (for example, paragraphs 0023 to 0045 and FIGS. 3 to 6)

However, as in the technique of the related art described above, in a case where a percussion position is detected using the peak value of a sensor, there may be a slight difference between a peak value when the vicinity of the sensor is percussed and a peak value when a position away from the sensor is percussed. Thus, there is a problem in that it may not be possible to accurately detect a percussion position.

SUMMARY

According to an embodiment of the disclosure, there is provided an electronic percussion instrument including: a percussion surface; a first sensor and a second sensor that detect a vibration of percussion on the percussion surface; and a first calculation unit that calculates a percussion position in a first direction which is a direction of alignment of the first sensor and the second sensor on the basis of a ratio or difference between an added-up value of output values of the first sensor within a predetermined time after the percussion surface is percussed and an added-up value of output values of the second sensor within the predetermined time.

According to an embodiment of the disclosure, there is provided a method of detecting a percussion position in an electronic percussion instrument including a percussion surface and a first sensor and a second sensor that detect a vibration of percussion on the percussion surface, the method including calculating a percussion position in a first direction which is a direction of alignment of the first sensor and the second sensor on the basis of a ratio or difference between an added-up value of output values of the first sensor within a predetermined time after the percussion surface is percussed and an added-up value of output values of the second sensor within the predetermined time.

DESCRIPTION OF THE EMBODIMENTS

According to an embodiment of the disclosure, it is to provide an electronic percussion instrument and a method of detecting a percussion position which make it possible to improve the accuracy of detection of the percussion position.

Figure 1A:
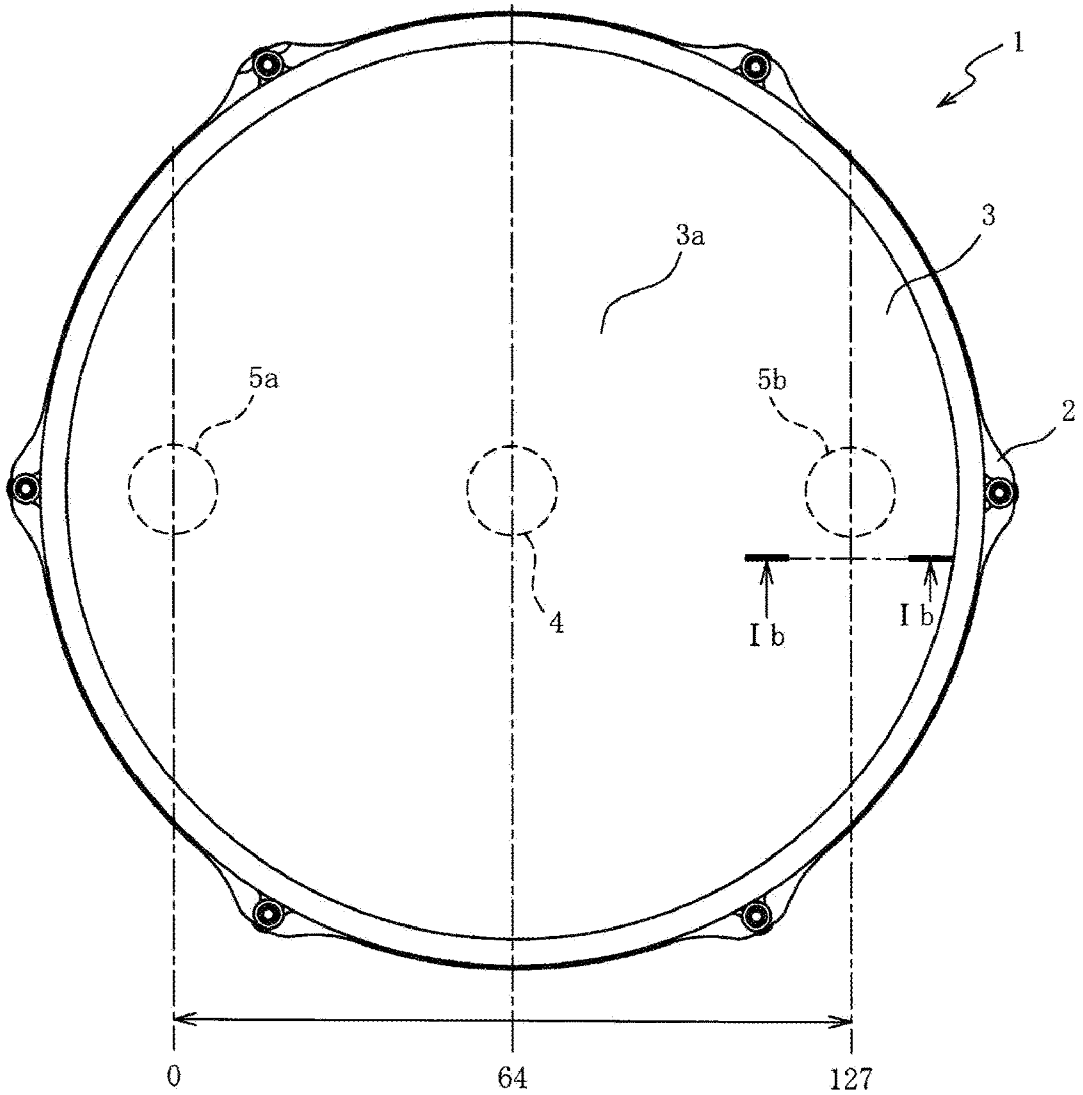
FIG. 1(*a*) is a top view of an electronic percussion instrument in a first embodiment, and FIG. 1(*b*) is a cross-sectional view along line Ib-Ib in FIG. 1(*a*) of the electronic percussion instrument.
Figure 1B:
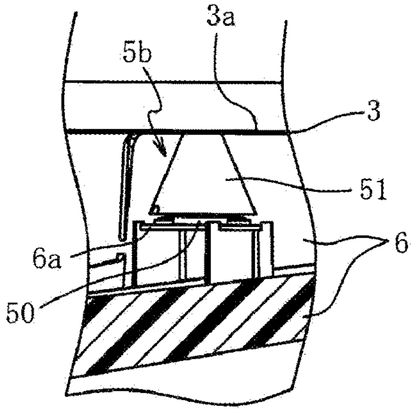

Hereinafter, preferred examples will be described with reference to the accompanying drawings. First, a configuration of an electronic percussion instrument 1 in a first embodiment will be described with reference to FIG. 1. FIG. 1(*a*) is a top view of the electronic percussion instrument 1 in the first embodiment, and FIG. 1(*b*) is a cross-sectional view along line Ib-Ib in FIG. 1(*a*) of the electronic percussion instrument 1.

Meanwhile, in the following description, the direction of alignment of first and second edge sensors 5*a* and 5*b* (a left-right direction in FIG. 1(*a*)) is defined as the left-right direction of the electronic percussion instrument 1, and a direction orthogonal to the left-right direction when seen in a top view (a depth direction as seen by a performer, or an up-down direction in FIG. 1(*a*)) is defined as a front-rear direction. Meanwhile, the direction of alignment of the first and second edge sensors 5*a* and 5*b* is a direction along a straight line connecting the centers of the first and second edge sensors 5*a* and 5*b*.

As shown in FIG. 1, the electronic percussion instrument 1 is an electronic drum that simulates an acoustic drum. The electronic percussion instrument 1 includes a cylindrical shell 2 of which the upper end side (front side in the vertical direction of the page of FIG. 1(*a*)) is open, and an opening on the upper end side of the shell 2 is covered with a head 3.

The head 3 is formed using a mesh knitted out of a synthetic fiber or a film made of a synthetic resin, and is fixed to the opening of the shell 2 in a state in which a predetermined tension is applied. The upper surface of the head 3 is a percussion surface 3*a* which is percussed by a performer, and a vibration during percussion of the percussion surface 3*a* is detected by a center sensor 4, the first edge sensor 5*a*, and the second edge sensor 5*b*.

The center sensor 4 is a sensor which is disposed at the center of the percussion surface 3*a* (on the axis of the shell 2), and the first and second edge sensors 5*a* and 5*b* are sensors which are disposed on sides closer to the edge of the percussion surface 3*a* than to the center sensor 4. Meanwhile, in the following description, when the center sensor 4 and the first and second edge sensors 5*a* and 5*b* are described collectively, they will be described as "each sensor."

Since the arrangement structure of each sensor (a support structure which is supported by a frame 6 in FIG. 1(*b*)) is substantially the same, only the arrangement structure of the second edge sensor 5*b* will be described below.

The frame 6 (see FIG. 1(*b*)) is formed in a bowl shape which is recessed downward, and the outer edge portion of the frame 6 is hooked on the upper end portion of the cylindrical shell 2 (see FIG. 1(*a*)). Thus, a space in which the second edge sensor 5*b* can be arranged is formed between the frame 6 and the head 3.

The second edge sensor 5*b* is attached to the upper surface of the frame 6 with a plate 6*a* interposed therebetween. The second edge sensor 5*b* is constituted by a sensor part 50 attached to the upper surface of the plate 6*a* and a cushion 51 attached to the upper surface of the sensor part 50. The sensor part 50 is a disc-shaped piezoelectric element, and the cushion 51 is a truncated-conical buffer material formed using an elastic material such as a sponge, rubber, or a thermoplastic elastomer.

The cushion 51 of the second edge sensor 5*b* is in contact with the lower surface of the head 3, and a vibration when the percussion surface 3*a* of the head 3 is percussed is transferred to the sensor part 50 through the cushion 51. Thereby, the vibration when the percussion surface 3*a* is percussed is detected by the second edge sensor 5*b* (the center sensor 4 and the first edge sensor 5*a*).

Meanwhile, in FIG. 1(*a*), the contour line of the sensor part 50 of the second edge sensor 5*b* is shown by a broken line, and similarly for the center sensor 4 and the first edge sensor 5*a*, the contour line of the sensor part is shown by a broken line.

The cushion of the center sensor 4 is in contact with the lower surface of the head 3 at the center of the percussion surface 3*a* (on the axis of the shell 2), and the cushions of the first and second edge sensors 5*a* and 5*b* are in contact with the lower surface of the head 3 at a position where a distance from the center of the percussion surface 3*a* is equal to or greater than 50% of the radius of the percussion surface 3*a*. In addition, the first and second edge sensors 5*a* and 5*b* are disposed at positions where distances from the center sensor 4 are equal to each other.

The presence or absence of percussion in a case where the percussion surface 3*a* is percussed is determined on the basis of an output value of the center sensor 4. In addition, coordinates "0 to 127" in the left-right direction of the percussion position are configured to be determined on the basis of an added-up value obtained by adding up output values of the first and second edge sensors 5*a* and 5*b* for a predetermined time. Such a configuration will be described with reference to FIGS. 1 and 2.

Figure 2A:
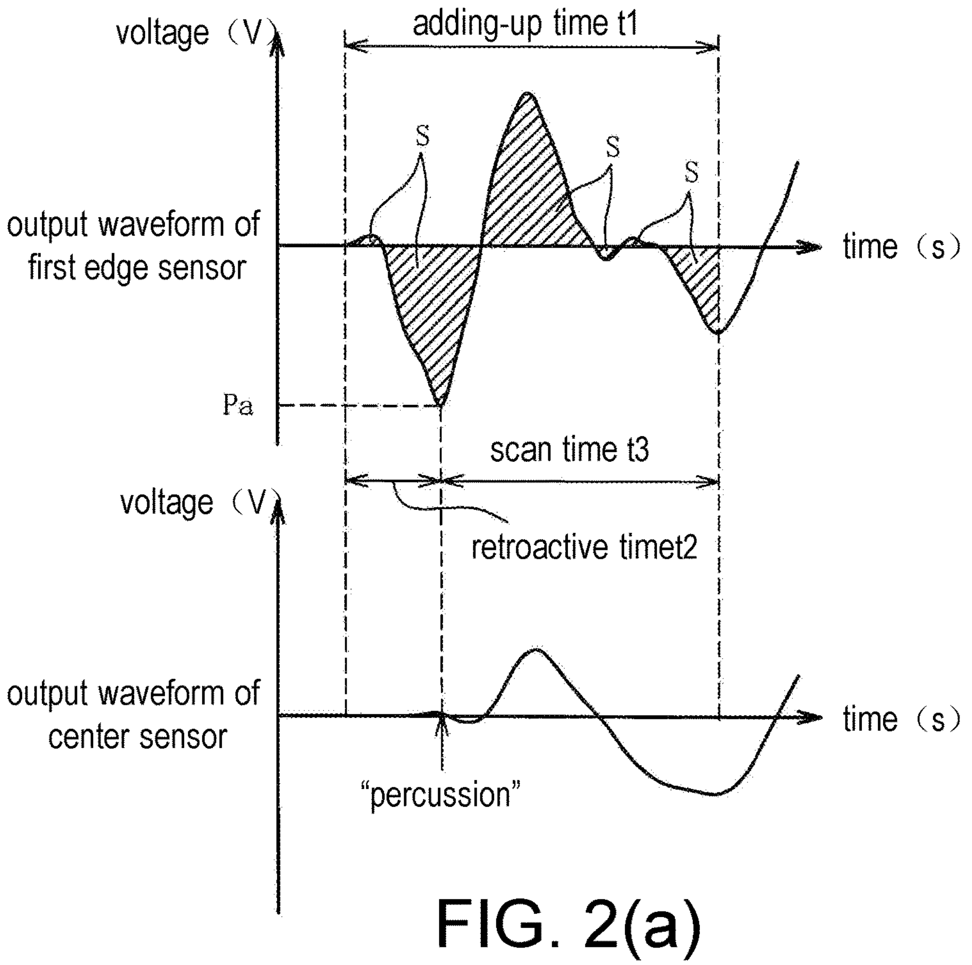
FIG. 2(*a*) is a graph illustrating an example of waveforms which are output by a first edge sensor and a center sensor during percussion, and FIG. 2(*b*) is a graph illustrating changes in the peak values and added-up values of first and second edge sensors associated with a change in a percussion position.
Figure 2B:
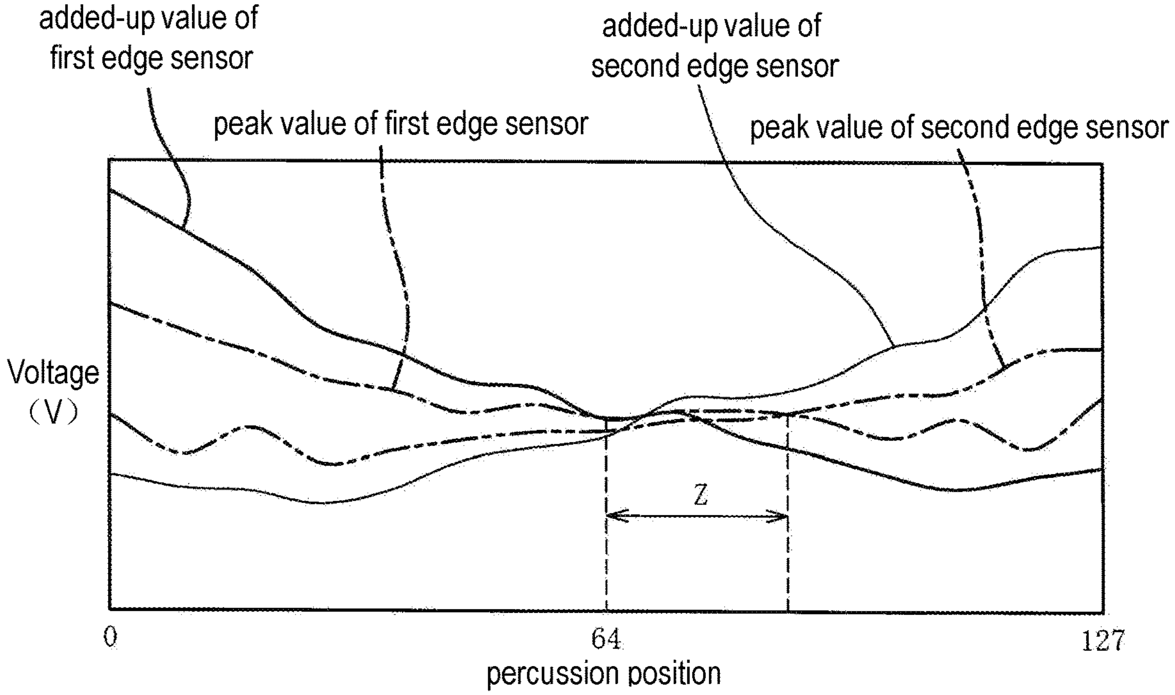

FIG. 2(*a*) is a graph illustrating an example of waveforms which are output by the first edge sensor 5*a* and the center sensor 4 during percussion. The vertical axis represents the magnitude (voltage) of an output value of each sensor, and the horizontal axis represents time. FIG. 2(*b*) is a graph illustrating changes in the peak values and added-up values of the first and second edge sensors 5*a* and 5*b* associated with a change in a percussion position. The vertical axis represents the magnitude (voltage) of the peak values or added-up values of the first and second edge sensors 5*a* and 5*b*, and the horizontal axis represents coordinates "0 to 127" in the left-right direction of the percussion position.

Meanwhile, for the coordinates of this percussion position, the position of the first edge sensor 5*a* in the left-right direction is "0," the position of the center sensor 4 is "64," and the position of the second edge sensor 5*b* is "127" (see FIG. 1(*a*)). In addition, in FIG. 2(*b*), the added-up value of the output value of the first edge sensor 5*a* is shown by a solid line, the peak value is shown by a dashed-dotted line, the added-up value of the output value of the second edge sensor 5*b* is shown by a thin line, and the peak value is shown by a dashed-two dotted line.

As shown in FIG. 2(*a*), when the percussion surface 3*a* is percussed by a performer, a peak value Pa of the first edge sensor 5*a* is detected after a predetermined time. In the related art, the percussion position was calculated using this peak value Pa. In this case, as shown in FIG. 2(*b*), there is a difference between a peak value in a case where the vicinity of the first edge sensor 5*a* (for example, a position where the coordinate of the percussion position is "0") is percussed and a peak value in a case where the vicinity of the center sensor 4 (for example, a position where the coordinate of the percussion position is "64") is percussed, but the difference is relatively small. That is, even in a case where the percussion position in the left-right direction changes, there may be no difference between the peak values of the first edge sensor 5*a* and the second edge sensor 5*b*. Thus, for example, in spite of the right side (left side) being percussed rather than the center of the percussion surface, the output value of the first edge sensor 5*a* (the second edge sensor 5*b*) may become larger (for example, a region shown by Z in FIG. 2(*b*)).

On the other hand, in the present embodiment, after the percussion surface 3*a* is percussed, the percussion position in the left-right direction is calculated by comparing the added-up value of the output values of the first edge sensor 5*a* with the added-up value of the output values of the second edge sensor 5*b*. As shown in FIG. 2(*a*), the added-up value of the output values of the first and second edge sensors 5*a* and 5*b* is a value obtained by numerically integrating the output values within an adding-up time t1 (predetermined time), that is, an approximate value of an area S of an output waveform within the adding-up time t1.

By calculating such an added-up value (integrated value) of the output values, as shown in FIG. 2(*b*), it is possible to make a great difference between the added-up value in a case where the vicinity of the first edge sensor 5*a* (for example, the position of the coordinate "0") is percussed and the added-up value in a case where the vicinity of the center sensor 4 (for example, the position of the coordinate "64") is percussed.

That is, an increase or decrease in a value associated with a change in the percussion position (the inclination of the graph in FIG. 2(*b*)) is larger in the added-up value than in the peak values of the first and second edge sensors 5*a* and 5*b*. Thereby, it is possible to accurately determine that a side close to one of the first edge sensor 5*a* and the second edge sensor 5*b* is percussed.

Here, as described above, the presence or absence of percussion on the percussion surface 3*a* is determined on the basis of the output value of the center sensor 4. In this case, for example, when percussion is performed at a position closer to the first edge sensor 5*a* than to the center sensor 4, as shown in FIG. 2(*a*), the output waveform of the first edge sensor 5*a* may rise before the determination of "percussion" is performed by the center sensor 4.

Thus, in the present embodiment, the starting point of the adding-up time t1 for calculating the added-up value of the output values of the first and second edge sensors 5*a* and 5*b* is set to a point in time before a point in time when the determination of "percussion" is made, and the added-up value is calculated retroactively by the amount of a retroactive time t2 after the determination of percussion is performed. Thereby, since the output value of the first edge sensor 5*a* (the second edge sensor 5*b*) can be prevented from being missed, it is possible to improve the accuracy of detection of the percussion position.

In addition, the center sensor 4 is disposed closer to the center of the percussion surface 3*a* than to the first and second edge sensors 5*a* and 5*b*. That is, since the center sensor 4 is disposed in a region where there is a high possibility of being percussed, a vibration during percussion can be easily detected by the center sensor 4 ahead of the first and second edge sensors 5*a* and 5*b*. Thus, since the output waveforms of the first and second edge sensors 5*a* and 5*b* can be prevented from rising before the determination of percussion is performed by the center sensor 4, it is possible to prevent the output values of the first and second edge sensors 5*a* and 5*b* from being missed.

Figures 3A, 3B:
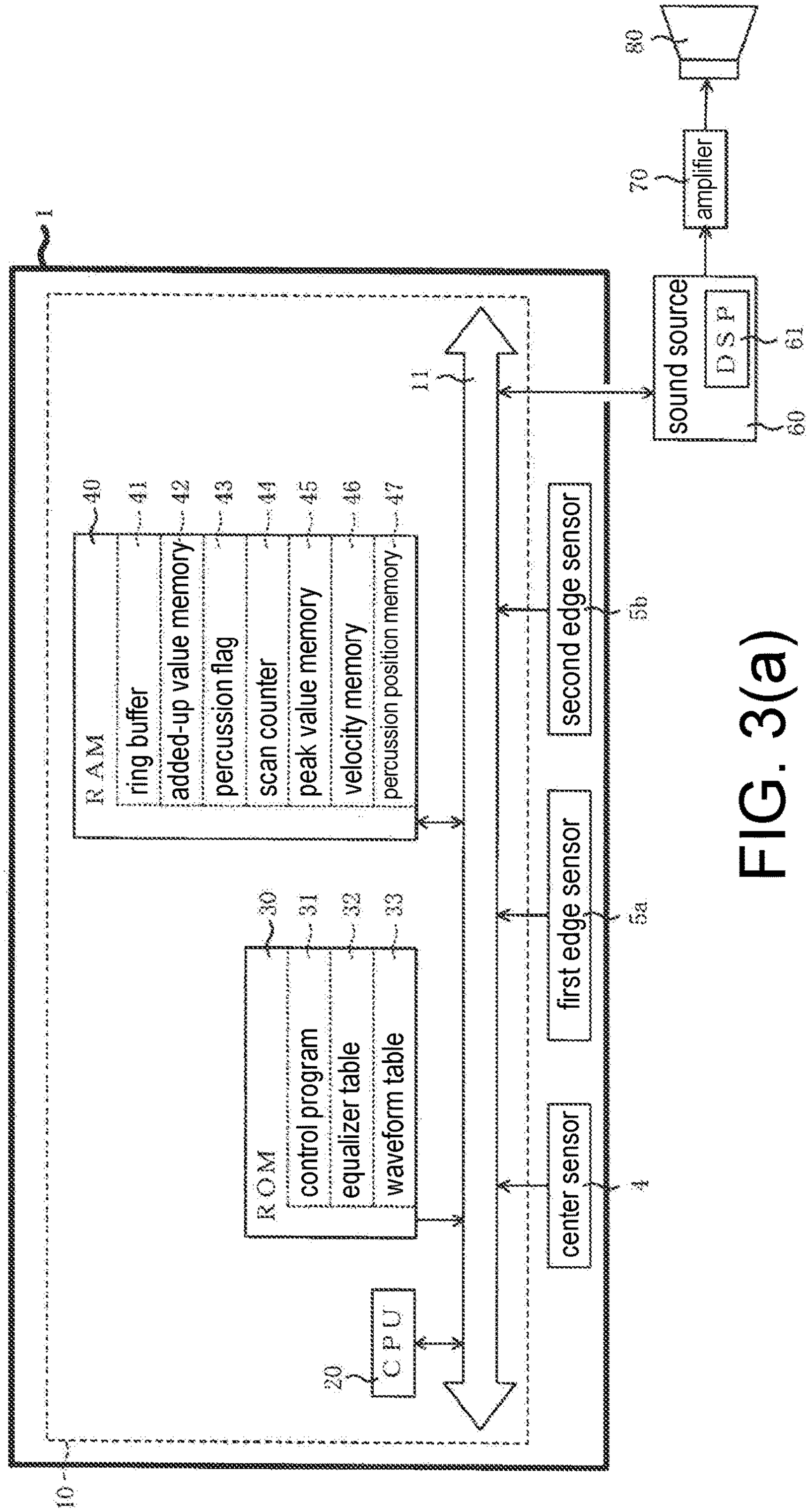
FIG. 3(*a*) is a block diagram illustrating an electrical configuration of the electronic percussion instrument, and FIG. 3(*b*) is a schematic diagram of a ring buffer.

Next, the details of a method of detecting a percussion position in such an electronic percussion instrument 1 and a method of generating a musical sound based on the detection of percussion will be described below. First, an electrical configuration of the electronic percussion instrument 1 will be described with reference to FIG. 3. FIG. 3(*a*) is a block diagram illustrating an electrical configuration of the electronic percussion instrument 1, and FIG. 3(*b*) is a schematic diagram of a ring buffer 41.

As shown in FIG. 3(*a*), the electronic percussion instrument 1 includes a control device 10 for controlling each part of the electronic percussion instrument 1. The control device 10 has a CPU 20, a ROM 30, and a RAM 40, and these components are connected to each other through a bus line 11. In addition, the center sensor 4, the first and second edge sensors 5*a* and 5*b*, and a sound source 60 are connected to the bus line 11. An amplifier 70 is connected to the sound source 60, and a speaker 80 is connected to the amplifier 70.

In a case where the percussion surface 3*a* is percussed, the electronic percussion instrument 1 outputs a sound production instruction according to detection results (output values) of the center sensor 4 and the first and second edge sensors 5*a* and 5*b* based on the percussion from the CPU 20 to the sound source 60.

The sound source 60 is a device that controls timbre of a musical sound (percussion sound), various effects, or the like in accordance with the sound production instruction from the CPU 20. A DSP 61 that performs arithmetic processing such as waveform data filtering or effect imparting is built into the sound source 60. The electronic percussion instrument 1 amplifies a musical sound signal processed by the sound source 60 using the amplifier 70, and emits a musical sound based on the musical sound signal from the speaker 80.

The CPU 20 is an arithmetic unit that controls each part connected by the bus line 11, and the ROM 30 is a non-rewritable memory. A control program 31, an equalizer table 32, and a waveform table 33 are stored (saved) in the ROM 30.

When the control program 31 is executed, an initialization process and a periodic process (see FIG. 4) to be described later are executed, and the details of these processes will be described later. The quality of a musical sound when the sound production instruction is given to the sound source 60 and information of waveform data are stored in the equalizer table 32 and the waveform table 33.

The RAM 40 is a memory that rewritably stores various types of work data, flags, and the like when the CPU 20 executes a program such as the control program 31. The RAM 40 is provided with the ring buffer 41, an added-up value memory 42, a percussion flag 43, a scan counter 44, a peak value memory 45, a velocity memory 46, and a percussion position memory 47.

The ring buffer 41 (see FIG. 3(*b*)) is a buffer that stores the output values of the first and second edge sensors 5*a* and 5*b* on which A/D conversion is performed for the past 5 msec. The ring buffer 41 is provided with a first edge sensor memory 41*a* that stores the output value of the first edge sensor 5*a* and a second edge sensor memory 41*b* that stores the output value of the second edge sensor 5*b*.

Each of the first and second edge sensor memories 41*a* and 41*b* is provided with a plurality of (No. 1 to 50) memories that stores the output values of the first and second edge sensors 5*a* and 5*b*, and the output values are stored in the plurality of memories in a time-series manner.

Writing the output values to the ring buffer 41 is performed in order from the memory of No. 1 which is the head of the storage position of the ring buffer 41. When the writing reaches the memory of No. 50 which is the end of the storage position of the ring buffer 41, the writing is continued by returning to the memory of No. 1 (overwriting the memory of No. 1). The added-up value of the output values of the first and second edge sensors 5*a* and 5*b* described above is calculated by referring to the ring buffer 41, and the calculated added-up value is stored in the added-up value memory 42.

The percussion flag 43 is a flag to be turned on in a case where percussion on the percussion surface 3*a* is detected by the center sensor 4. Although the details will be described later, a period in which the percussion flag 43 is ON is set as a scan time t3 (see FIG. 2(*a*) or 3(*b*)).

The scan counter 44 is a counter indicating whether the scan time t3 has elapsed, and the peak value memory 45 is a memory in which the peak value of each sensor during the scan time t3 is stored. The velocity memory 46 is a memory for storing the value of velocity (percussion force) calculated on the basis of the peak value of each sensor, and the percussion position memory 47 is a memory for storing a percussion position (coordinate) calculated from the added-up value of output values of the first and second edge sensors 5*a* and 5*b* described above.

Figure 4A:
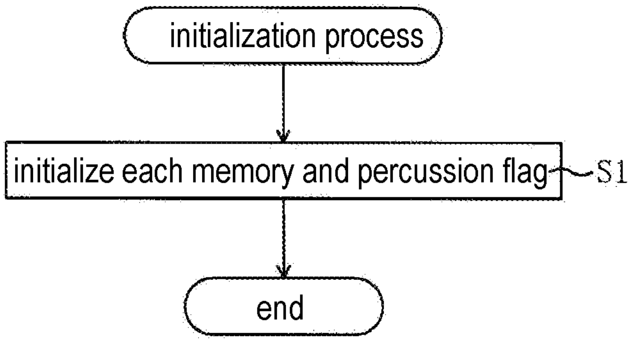
FIG. 4(*a*) is a flow chart illustrating an initialization process, and FIG. 4(*b*) is a flow chart illustrating a periodic process.
Figure 4B:
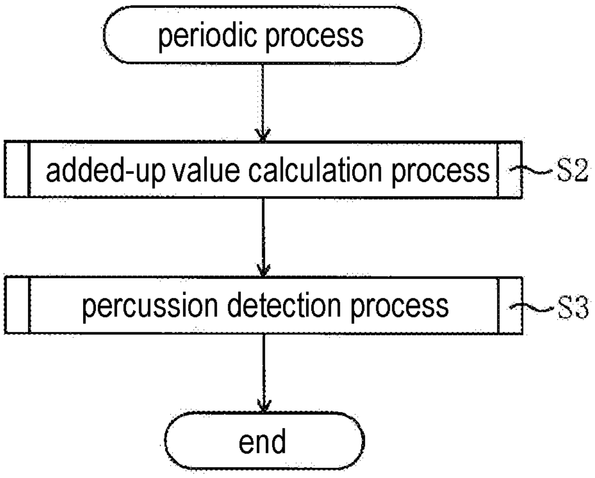

Next, processes which are executed by the CPU 20 of the electronic percussion instrument 1 will be described with reference to FIG. 4. FIG. 4(*a*) is a flow chart illustrating an initialization process, and FIG. 4(*b*) is a flow chart illustrating a periodic process. The initialization process shown in FIG. 4(*a*) is executed immediately after power-up of the electronic percussion instrument 1.

As shown in FIG. 4(*a*), in the initialization process, each memory and a flag are initialized (S1). Specifically, "0" is set in each memory of No. 1 to 50 of the ring buffer 41, the added-up value memory 42, the peak value memory 45, the velocity memory 46, and the percussion position memory 47, and the percussion flag 43 is set to "OFF."

Figure 5:
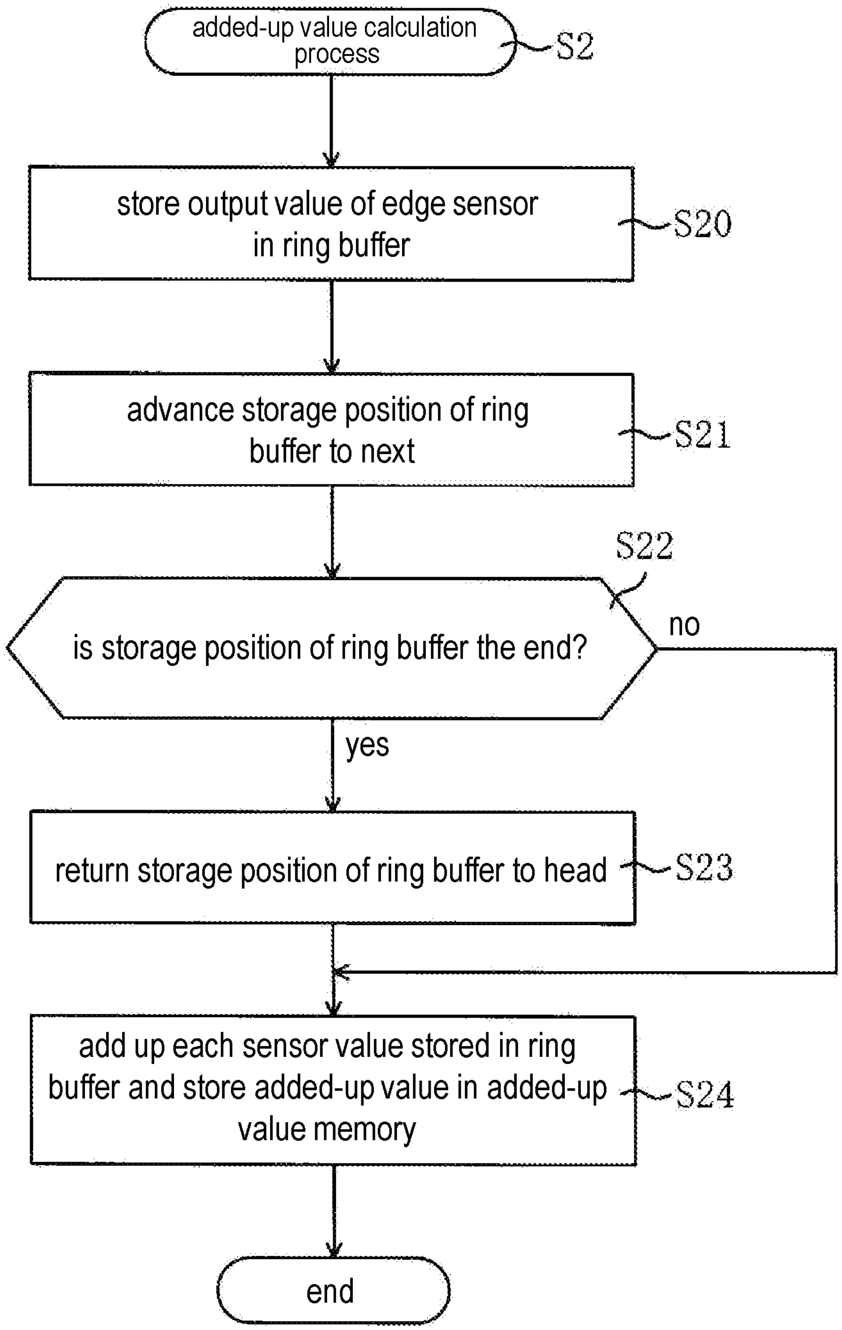
FIG. 5 is a flow chart illustrating an added-up value calculation process.
Figure 6:
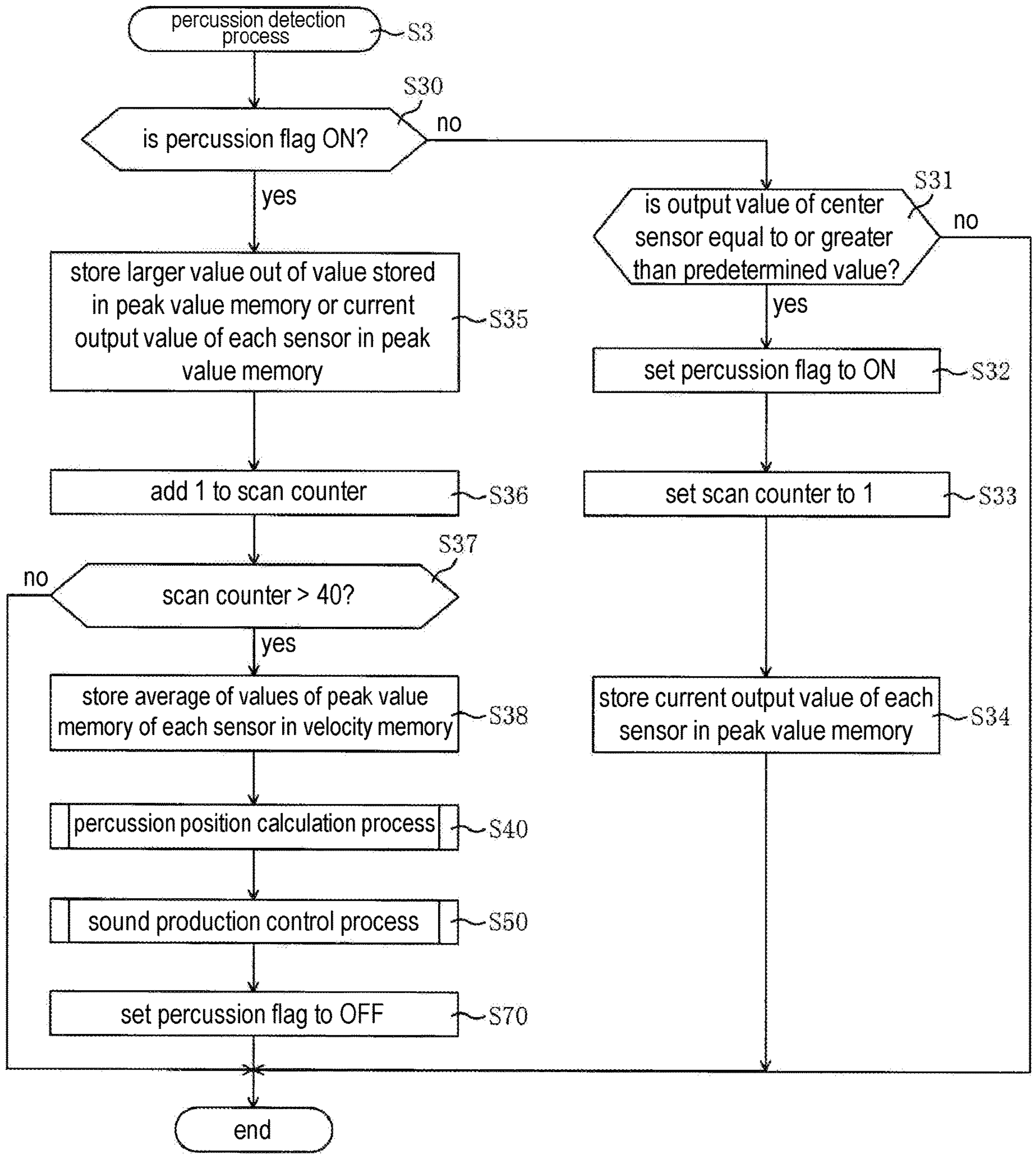
FIG. 6 is a flow chart illustrating a percussion detection process.

The periodic process shown in FIG. 4(*b*) is repeatedly executed every 0.1 msec through an interval interrupt process every 0.1 msec after the initialization process. In the periodic process, an added-up value calculation process (S2) of calculating the added-up value of the output values of the first and second edge sensors 5*a* and 5*b* and a percussion detection process (S3) of calculating a percussion force and a percussion position on the basis of the output value of each sensor and performing sound production control are performed in order. These processes will be described with reference to FIGS. 5 and 6. FIG. 5 is a flow chart illustrating the added-up value calculation process (S2), and FIG. 6 is a flow chart illustrating the percussion detection process (S3).

As shown in FIG. 5, in the added-up value calculation process of S2, the current output values of the first and second edge sensors 5*a* and 5*b* are first stored in the ring buffer 41 (S20). As described above, "0" is set in each memory of the ring buffer 41 through the initialization process immediately after power-up of the electronic percussion instrument 1. Thus, in the initial added-up value calculation process (S2) after such power-up, the output values of the first and second edge sensors 5*a* and 5*b* are stored in the memory of No. 1 through the process of S20.

After the process of S20, in order to store the output values of the first and second edge sensors 5*a* and 5*b* in the next memory in the next added-up value calculation process S2, the storage position of the ring buffer 41 is advanced to the next memory (for example, the memory of No. 2) (S21). After the process of S21, it is confirmed whether the storage position of the ring buffer 41 advanced in S21 is No. 50 which is the end (S22). In a case where the storage position of the ring buffer 41 is the end (S22: Yes), the storage position of the ring buffer 41 is returned to No. 1 which is the head (S23), and the flow proceeds to the process of S24.

On the other hand, in the process of S21, for example, in a case where the storage position of the ring buffer 41 is advanced to the memory of No. 2, that is, a case where the storage position of the ring buffer 41 is not the end (S22: No), the process of S23 is skipped.

After the process of S23 and the process of S22: No, the added-up value obtained by adding up all the output values of the first edge sensor 5*a* stored in the ring buffer 41 and the added-up value obtained by adding up all the output values of the second edge sensor 5*b* stored therein are stored in the added-up value memory 42 (S24), and the flow proceeds to the percussion detection process (S3) shown in FIG. 6.

As shown in FIG. 6, in the percussion detection process S3, it is first confirmed whether the percussion flag 43 is ON (S30). In a case where percussion is not yet detected by the center sensor 4 and the percussion flag 43 is OFF (S30: No), it is confirmed whether the current output value of the center sensor 4 is equal to or greater than a predetermined value in order to confirm whether the percussion surface 3*a* is percussed (S31).

In a case where the output value of the center sensor 4 is less than a predetermined value (S31: No), the percussion detection process is ended. After the end of the percussion detection process, the added-up value calculation process (S2) (see FIG. 5) is executed again. That is, since the added-up value calculation process (S2) is repeated even while percussion on the percussion surface 3*a* is not performed (while S30: No and S31: No continue), the output values of the first and second edge sensors 5*a* and 5*b* in the ring buffer 41 are updated, and the added-up value in the added-up value memory 42 is updated.

On the other hand, in a case where the percussion surface 3*a* is percussed and the output value of the center sensor 4 is equal to or greater than a predetermined value (S31: Yes), the percussion flag 43 is set to "ON" (S32), and the scan counter 44 is set to 1 (S33).

After the process of S33, the current output value of each sensor is stored in the peak value memory 45 (S34), and a series of processes are ended. Through the process of S34, the peak value of each sensor can be stored in the peak value memory 45 immediately after the determination of "percussion" is performed, and thus it is possible to prevent the peak value from being missed.

After the process of S34, the percussion detection process (S3) is executed again through the added-up value calculation process (S2). Thus, in a case where the determination of "percussion" is performed by the center sensor 4 (S31: Yes) and the percussion detection process (S3) is executed in a state where the percussion flag 43 is set to ON (S30: Yes), the larger value out of the value stored in the peak value memory 45 or the current output value of each sensor is stored in the peak value memory 45 (S35), and 1 is added to the scan counter 44 (S36).

After the process of S36, it is confirmed whether the value of the scan counter 44 exceeds 40 (S37), and in a case where the value of the scan counter 44 is equal to or less than 40 (S37: No), a series of processes are ended. That is, during the scan time t3 until the value of the scan counter exceeds 40 (while S37: No continues), the added-up value calculation process (S2) and the processes of S35 to S37 are repeated. Thus, during the scan time t3, the output values of the first and second edge sensors 5*a* and 5*b* in the ring buffer 41 are updated, the added-up value in the added-up value memory 42 is updated, and the peak value of each sensor in the peak value memory 45 is updated.

In this case, since the scan time t3 continues until the value of the scan counter exceeds 40, the output values of the first and second edge sensors 5*a* and 5*b* in the ring buffer 41 are repeatedly updated 40 times during the scan time t3.

Thus, as shown in FIG. 3(*b*), for example, in a case where the determination of "percussion" is performed after the memory of No. 10 of the ring buffer 41 is updated, the memories of No. 11 to 50 are updated during the scan time t3. On the other hand, the memories of No. 1 to 10 are updated before the scan time t3 is started, but the memories of No. 1 to 10 is configured to store the output values of the first and second edge sensors 5*a* and 5*b* during the retroactive time t2 described above.

That is, the temporal length (predetermined storage time) of the storage region of the ring buffer 41 is set to the same length as a time obtained by adding the retroactive time t2 to the scan time t3, that is, the adding-up time t1 obtained by adding up the output values of the first and second edge sensors 5*a* and 5*b* (see FIG. 2(*a*)). Thereby, a process of adding up all the output values (calculating a sum) stored in the ring buffer 41 is performed each time the ring buffer 41 is updated, and thus it is possible to add up the output values of the first and second edge sensors 5*a* and 5*b* by the amount of the adding-up time t1. That is, when the added-up value in the adding-up time t1 (retroactive time t2+scan time t3) is calculated, it is not necessary to specify in which storage region of the ring buffer 41 the added-up value is to be calculated, and thus it is possible to facilitate a process of calculating the added-up value.

A description will be given referring back to FIG. 6. In a case where the end timing of the scan time t3 is reached, that is, a case where the scan counter exceeds 40 (S37: Yes), the average of values of the peak value memory 45 of each sensor is calculated and stored in the velocity memory 46 in order to calculate the strength (velocity) of percussion (S38).

After the process of S38, a percussion position calculation process (S40) of calculating a percussion position and a sound production control process (S50) of performing sound production control based on a percussion force and a percussion position are performed in order. Thereafter, the percussion flag 43 is set to OFF (S70), and a series of processes are ended.

Figure 7:
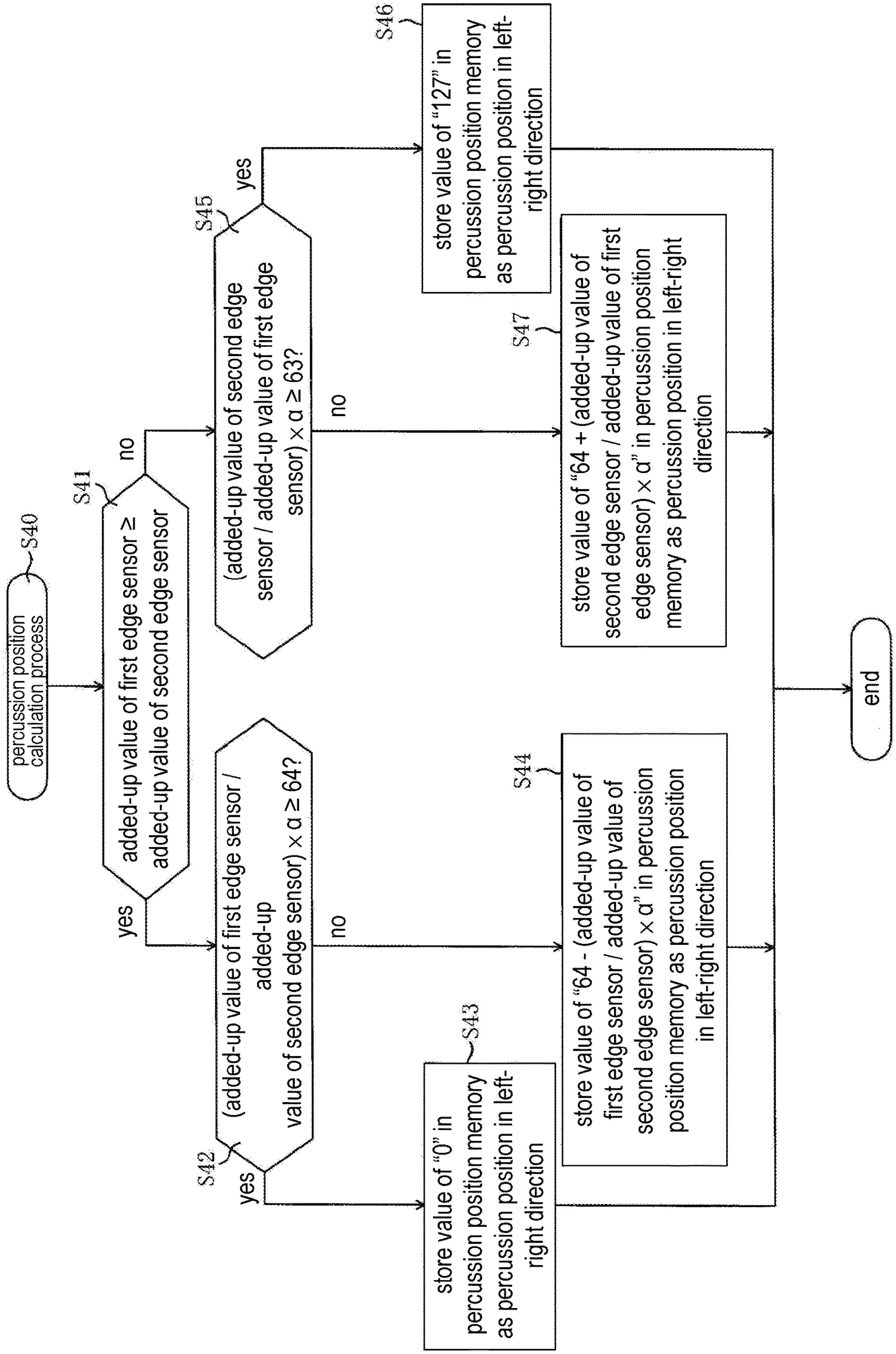
FIG. 7 is a flow chart illustrating a percussion position calculation process.
Figure 8:
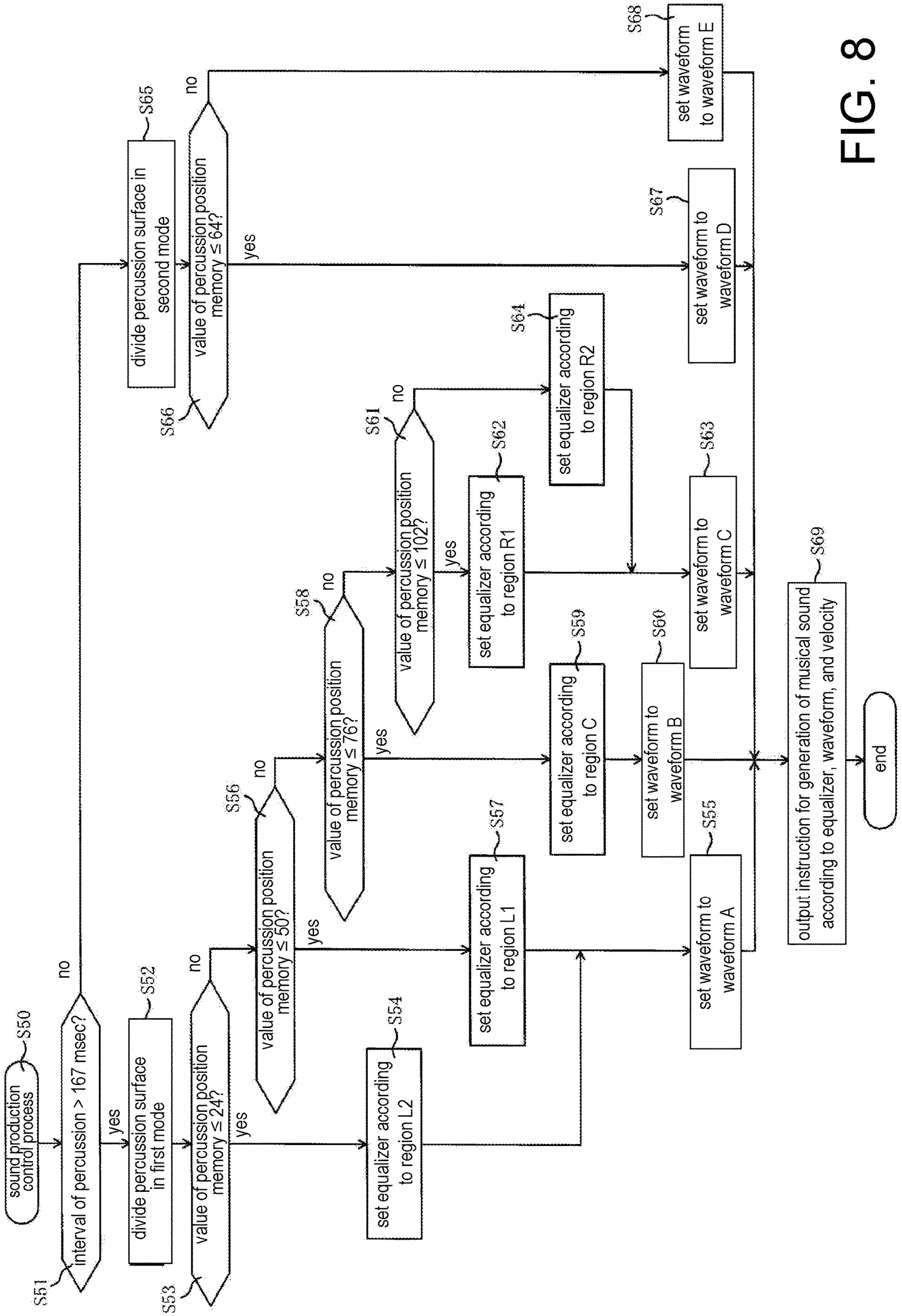
FIG. 8 is a flow chart illustrating a sound production control process.

Next, the percussion position calculation process (S40) and the sound production control process (S50) will be described with reference to FIGS. 7 and 8, but FIG. 9 will also be appropriately referred to and described. FIG. 7 is a flow chart illustrating the percussion position calculation process (S40), and FIG. 8 is a flow chart illustrating the sound production control process (S50).

As shown in FIG. 7, in the percussion position calculation process (S40), the added-up value memory 42 is first referred to and it is confirmed whether the added-up value of the output values of the first edge sensor 5*a* is equal to or greater than the added-up value of the output values of the second edge sensor 5*b* (S41).

In a case where the added-up value of the first edge sensor 5*a* is equal to or greater than the added-up value of the second edge sensor 5*b* (S41: Yes), it is confirmed whether a value obtained by multiplying a ratio of an added-up value (at the added-up value calculation process at a second time or more than the second time) which is "the added-up value of the first edge sensor 5*a*/the added-up value of the second edge sensor 5*b*" by a predetermined correction coefficient α is equal to or greater than 64 (S42). In a case where such a value is equal to or greater than 64 (S42: Yes), the value of "0" is stored in the percussion position memory 47 as a percussion position in the left-right direction (S43). This value of "0" is a coordinate indicating a percussion position in the left-right direction (see FIG. 9).

On the other hand, in a case where the value of (the added-up value of the first edge sensor 5*a*/the added-up value of the second edge sensor 5*b*)×α is less than 64 (S42: No), the value of "64−(the added-up value of the first edge sensor 5*a*/the added-up value of the second edge sensor 5*b*)×α" is stored in the percussion position memory 47 as a percussion position in the left-right direction (S44). Similarly, this value of "64—(the added-up value of the first edge sensor 5*a*/the added-up value of the second edge sensor 5*b*)×α" is also a coordinate indicating a percussion position in the left-right direction. The coordinates "0 to 64" of the percussion position on the left side including the center of the percussion surface 3*a* (a position at which the coordinate of the percussion position is 0) are calculated through the processes of S43 and 44.

On the other hand, in a case where the added-up value of the first edge sensor 5*a* is less than the added-up value of the second edge sensor 5*b* (S41: No), it is confirmed whether a value obtained by multiplying "the added-up value of the second edge sensor 5*b*/the added-up value of the first edge sensor 5*a*" by the predetermined correction coefficient α is equal to or greater than 63 (S45). In a case where such a value is equal to or greater than 63 (S45: Yes), the value of "127" is stored in the percussion position memory 47 as a percussion position in the left-right direction (S46). This value of "127" is a coordinate indicating a percussion position in the left-right direction (see FIG. 9).

On the other hand, in a case where the value of (the added-up value of the second edge sensor 5*b*/the added-up value of the first edge sensor 5*a*)×α is less than 63 (S45: No), the value of "64+(the added-up value of the second edge sensor 5*b*/the added-up value of the first edge sensor 5*a*)×α" is stored in the percussion position memory 47 as a percussion position in the left-right direction. Similarly, this value of "64+(the added-up value of the second edge sensor 5*b*/the added-up value of the first edge sensor 5*a*)×α" also is a coordinate indicating a percussion position in the left-right direction. The coordinates of "64 to 127" indicating the percussion position closer to the right side than to the center of the percussion surface 3*a* are calculated through the processes of S46 and 47.

In this manner, a coordinate indicating a percussion position in the left-right direction is calculated on the basis of a ratio between the added-up value (at the added-up value calculation process at a second time or more than the second time) of the output values of the first edge sensor 5*a* and the added-up value of the output values of the second edge sensor 5*b*. Thus, as described above, it is possible to calculate the coordinate of a percussion position more accurately than in a case where the peak values of the first and second edge sensors 5*a* and 5*b* are used.

In addition, a musical sound having different sound quality is generated due to a difference in the percussion position in the left-right direction. The outline of such a configuration is shown in FIG. 9. FIG. 9(*a*) is a top view of the electronic percussion instrument 1 schematically illustrating divided regions on the percussion surface 3*a* in a first mode, and FIG. 9(*b*) is a top view of the electronic percussion instrument 1 schematically illustrating divided regions on the percussion surface 3*a* in a second mode. Meanwhile, FIG. 9 shows information on waveforms set in accordance with divided regions on the percussion surface 3*a* and equalizer settings as tables.

Figure 9A:
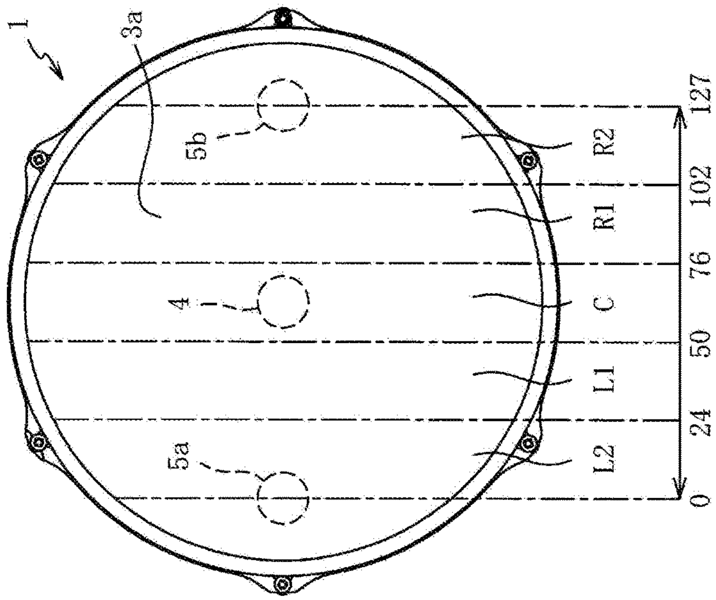
FIG. 9(*a*) is a top view of the electronic percussion instrument schematically illustrating divided regions on a percussion surface in a first mode, and FIG. 9(*b*) is a top view of the electronic percussion instrument schematically illustrating divided regions on the percussion surface in a second mode.
Figure 9B:
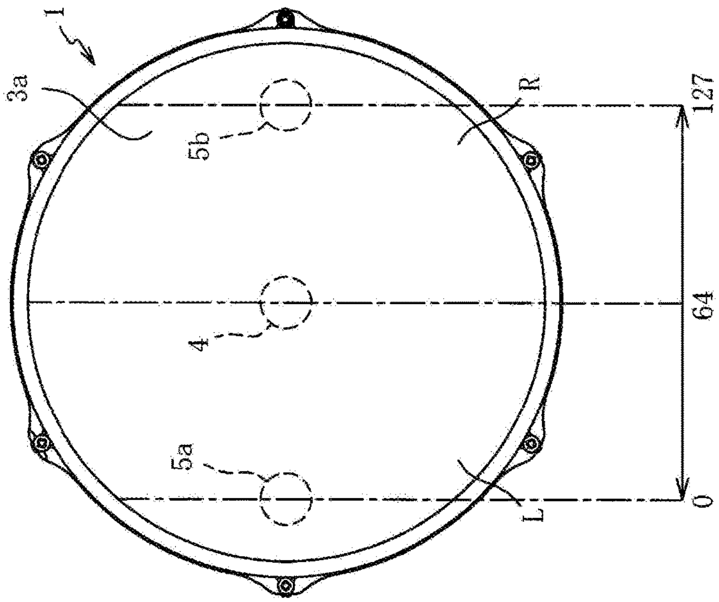

As shown in FIG. 9, virtual divided regions, or a plurality of divided regions lined up in the left-right direction is formed on the percussion surface 3*a* of the electronic percussion instrument 1, and musical sounds having sound quality according to the divided regions are generated. Thereby, it is possible to perform various performances.

More specifically, the electronic percussion instrument 1 has a first mode in which five divided regions of a region L2, a region L1, a region C, a region R1, and a region R2 are formed in order from the left side of the percussion surface 3*a* (see FIG. 9(*a*)), and a second mode in which two divided regions of a region L and a region R with the center of the percussion surface 3*a* as a boundary are formed (see FIG. 9(*b*)).

The region C in the first mode shown in FIG. 9(*a*) is formed in a region including the center sensor 4, the regions L2 and L1 are formed closer to the first edge sensor 5*a* side than to the region C, and the regions R1 and R2 are formed closer to the second edge sensor 5*b* side than to the region C.

A boundary between the region L2 and the region L1 is formed at a position where the coordinate of the percussion position in the left-right direction is "24," and a boundary between the region L1 and the region C is formed at a position where the coordinate is "50." In addition, a boundary between the region C and the region R1 is formed at a position where the coordinate of the percussion position in the left-right direction is "76," and a boundary between the region R1 and the region R2 is formed at a position where the coordinate is "102." That is, each region in the first mode is formed so as to substantially equally divide a region from the center of the first edge sensor 5*a* to the center of the second edge sensor 5*b* into five regions.

On the other hand, a boundary between the regions L and R in the second mode shown in FIG. 9(*b*) is formed at a position where the coordinate of the percussion position in the left-right direction is "64." That is, each region in the second mode is formed so as to divide the percussion surface 3*a* into right and left halves.

The first mode and the second mode are switched depending on the interval of percussion on the percussion surface 3*a*. The interval of percussion is an interval from when the percussion flag 43 is set to OFF to when it is set to ON next. Various performances are possible by switching between the first mode and the second mode (changing a formation mode for divided regions on the percussion surface 3*a*) due to such a change in the interval of percussion.

Here, in a case where the interval of percussion is relatively long, there is a high possibility of a performer being percussing the percussion surface 3*a* with a one-handed stick (or directly with one hand). In a case where a performer is percussing the percussion surface 3*a* with one hand, there is a higher possibility of the center of the percussion surface 3*a* being percussed than in a case where the percussion surface is percussed with both hands. For this reason, in a case where the interval of percussion is relatively long, the first mode in which the divided region C is located at the center of the percussion surface 3*a* is set.

On the other hand, in a case where the interval of percussion is relatively short, there is a high possibility of a performer being percussing the percussion surface 3*a* with both-handed sticks (or directly with both hands), and in such a case, there is a high possibility of the right and left regions with the center of the percussion surface 3*a* interposed therebetween being percussed instead of the center of the percussion surface 3*a*. Thus, in a case where the interval of percussion is relatively short, the second mode in which the divided regions L and R are formed on the right and left sides with the center of the percussion surface 3*a* interposed therebetween is set.

In this manner, divided regions appropriate for a performer's playing style can be formed by switching between the first mode in which the region C is located at the center of the percussion surface 3*a* and the second mode in which the regions L and R are located on the right and left sides with the center of the percussion surface 3*a* interposed therebetween in accordance with the interval of percussion.

In each of these modes, control is performed so as to generate different musical sounds in a case where different regions are percussed. Such control is performed in the sound production control process of FIG. 8.

As shown in FIG. 8, in the sound production control process (S50), it is first confirmed whether the interval of percussion on the percussion surface 3*a* is less than 167 msec (S51). This is because the interval of percussion is 167 msec when percussion is performed at the interval of eighth notes using a tempo as 180 bpm, and in a case where the interval of percussion is longer than 167 msec, there is a high possibility of performance being executed with one hand.

Thus, in a case where the interval of percussion is longer than 167 msec (S51: Yes), the percussion surface 3*a* is divided in the first mode (see FIG. 9(*a*)) (S52). After the process of S52, in order to determine which of the regions L2, L1, C, R1, and R2 in the first mode is percussed, the percussion position memory 47 is referred to and it is confirmed whether a coordinate indicating a percussion position in the left-right direction is equal to or less than "24" (S53).

In a case where the value of the percussion position memory 47 is equal to or less than 24 (S53: Yes), it means that the region L2 is percussed. Therefore, an equalizer according to the region L2 is set with reference to the equalizer table 32 (S54), and a waveform A is next set as waveform data of a musical sound generated during percussion on the region L2 with reference to the waveform table 33 (S55).

As shown in FIG. 9(*a*), equalizer settings for the waveform A used in the region L2 involve performing the settings of a frequency for adjusting characteristics (230 Hz in the region L2), a Q value (30 in the region L2) of how much the frequency band is adjusted around the frequency, and Gain (−15 dB in the region L2) of how much the sound volume of the frequency band is raised or lowered.

On the other hand, in the process of S53, in a case where the value of the percussion position memory 47 exceeds 24 (S53: No), it is confirmed whether the value of the percussion position memory 47 is equal to or less than 50 (S56). In a case where the value of the percussion position memory 47 is equal to or less than 50 (S56: Yes), it means that the region L1 is percussed. Therefore, an equalizer according to the region L1 is set with reference to the equalizer table 32 (S57), and the waveform A is next set as waveform data of a musical sound generated during percussion on the region L1 with reference to the waveform table 33 (S55).

As shown in FIG. 9(*a*), the equalizer settings in the region L1 are such that a frequency for adjusting the characteristics is 480 Hz, a Q value is 30, and Gain is +10 dB with respect to the waveform A used in the region L1. In the equalizer settings in the regions L2 and L1, a frequency for performing adjustment (230 Hz and 480 Hz) and the value of Gain (−15 dB and +10 dB) are different from those mentioned above. Thus, the waveform data used in the regions L2 and L1 is a common waveform A, but it is configured so that musical sounds having different sound qualities are generated in a case where the region L2 is percussed and a case where the region L1 is percussed. Thus, various performances can be executed by percussing each of the regions L2 and L1.

On the other hand, in the process of S56, in a case where the value of the percussion position memory 47 exceeds 50

(S56: No), it is confirmed whether the value of the percussion position memory 47 is equal to or less than 76 (S58). In a case where the value of the percussion position memory 47 is equal to or less than 76 (S58: Yes), it means that the region C is percussed. Therefore, an equalizer according to the region C is set with reference to the equalizer table 32 (S59), and a waveform B is next set as waveform data of a musical sound generated during the percussion of the region C with reference to the waveform table 33 (S60).

In this region C, as shown in FIG. 9(*a*), the waveform B is output as it is without performing the equalizer settings. That is, in a case where the outside (for example, the regions L2 and L1 described above) is percussed rather than the region C at the center of the percussion surface 3*a*, the quality of the musical sound is changed, whereas, in a case where the region C at the center of the percussion surface 3*a* is percussed, the quality of the musical sound is not changed.

Thereby, a standard musical sound is generated in the region C at the center of the percussion surface 3*a* having a high possibility of being percussed during a normal performance, and in a case where a region located further outside than the region C is percussed, it is possible to generate a musical sound with a predetermined frequency emphasizes (with an effect imparted) by the equalizer settings. Thus, by executing a performance while mainly percussing the region C and interweaving percussion on the outside rather than the region C, it is possible to facilitate the performance in which a standard musical sound and a musical sound with a predetermined frequency emphasized are combined.

On the other hand, in the process of S58, in a case where the value of the percussion position memory 47 exceeds 76 (S58: No), it is confirmed whether the value of the percussion position memory 47 is equal to or less than 102 (S61). In a case where the value of the percussion position memory 47 is equal to or less than 102 (S61: Yes), it means that the region R1 is percussed. Therefore, an equalizer according to the region R1 is set with reference to the equalizer table 32 (S62), and a waveform C is next set as waveform data of a musical sound generated during percussion on the region R1 with reference to the waveform table 33 (S63).

On the other hand, in the process of S61, in a case where the value of the percussion position memory 47 exceeds 102 (S61: No), it means that the region R2 is percussed. Therefore, an equalizer according to the region R2 is set with reference to the equalizer table 32 (S64), and the waveform C is next set as waveform data of a musical sound generated during percussion on the region R2 with reference to the waveform table 33 (S63).

As shown in FIG. 9(*a*), the equalizer settings in these regions R1 and R2 are such that a frequency for adjusting the characteristics is 520 Hz, a Q value is 30, and Gain is −8 dB with respect to the waveform C used in the region R1. In addition, a frequency for adjusting the characteristics is 320 Hz, a Q value is 30, and Gain is +12 dB with respect to the waveform C used in the region R2.

That is, in the present embodiment, the waveform A of a musical sound generated when the regions L2 and L1 are percussed, the waveform B of a musical sound generated when the region C is percussed, and the waveform C of a musical sound generated when the regions R1 and R2 are percussed are constituted by different waveform data. Further, since a frequency adjusted by an equalizer in each region is also a different frequency, it is possible to execute more various performances.

On the other hand, in the process of S51, in a case where percussion is performed at intervals of 167 msec or less (S51: No), there is a high possibility of being performed with both hands, and thus the percussion surface 3*a* is divided in the second mode (see FIG. 9(*b*)) (S65). After the process of S65, in order to determine which of the regions L and R in the second mode is percussed, the percussion position memory 47 is referred to and it is confirmed whether a coordinate indicating a percussion position in the left-right direction is equal to or less than "64" (S66).

In a case where the value of the percussion position memory 47 is equal to or less than 64 (S66: Yes), it means that the region L is percussed, and thus a waveform D is set as waveform data of a musical sound generated during percussion on the region L with reference to the waveform table 33 (S67). In addition, in the process of S66, in a case where the value of the percussion position memory 47 exceeds 64 (S66: No), it means that the region R is percussed, and thus a waveform E is set as waveform data of a musical sound generated during percussion on the region R with reference to the waveform table 33 (S68).

In this manner, various performances are possible by setting the waveform data of musical sounds generated in the right and left regions L and R to different waveforms D and E. Further, since the waveforms A, B, and C used during percussion on each region in the first mode and the waveforms D and E used during percussion on each region in the second mode are different waveform data, it is possible to execute more various performances.

After S55, 60, 63, 67, and 68 for setting the equalizers and the waveforms as described above, an instruction for generation of a musical sound according to the settings of the equalizers and the waveforms and the velocity (the strength of percussion) stored in the velocity memory 46 is output to the sound source 60 (S69).

Thereby, a musical sound having sound quality according to the divided region of the percussion surface 3*a* is generated. As described above, it is determined which of the divided regions is percussed by comparing the added-up value of the output values of the first edge sensor 5*a* with the added-up value of the output values of the second edge sensor 5*b*. Thus, since the accuracy of detection of the percussion position can be determined more accurately than in a method of the related art using the peak values of the first and second edge sensors 5*a* and 5*b*, it is possible to generate an appropriate musical sound according to a percussed region.

Next, a second embodiment will be described. In the first embodiment, a case where the electronic percussion instrument 1 is constituted as an electronic drum has been described, but in the second embodiment, a case where an electronic percussion instrument 201 is constituted as an electronic cymbal will be described. Meanwhile, the same portions as those in the above-described first embodiment are denoted by the same reference numerals and signs, and the description thereof will be omitted.

Figure 10A:
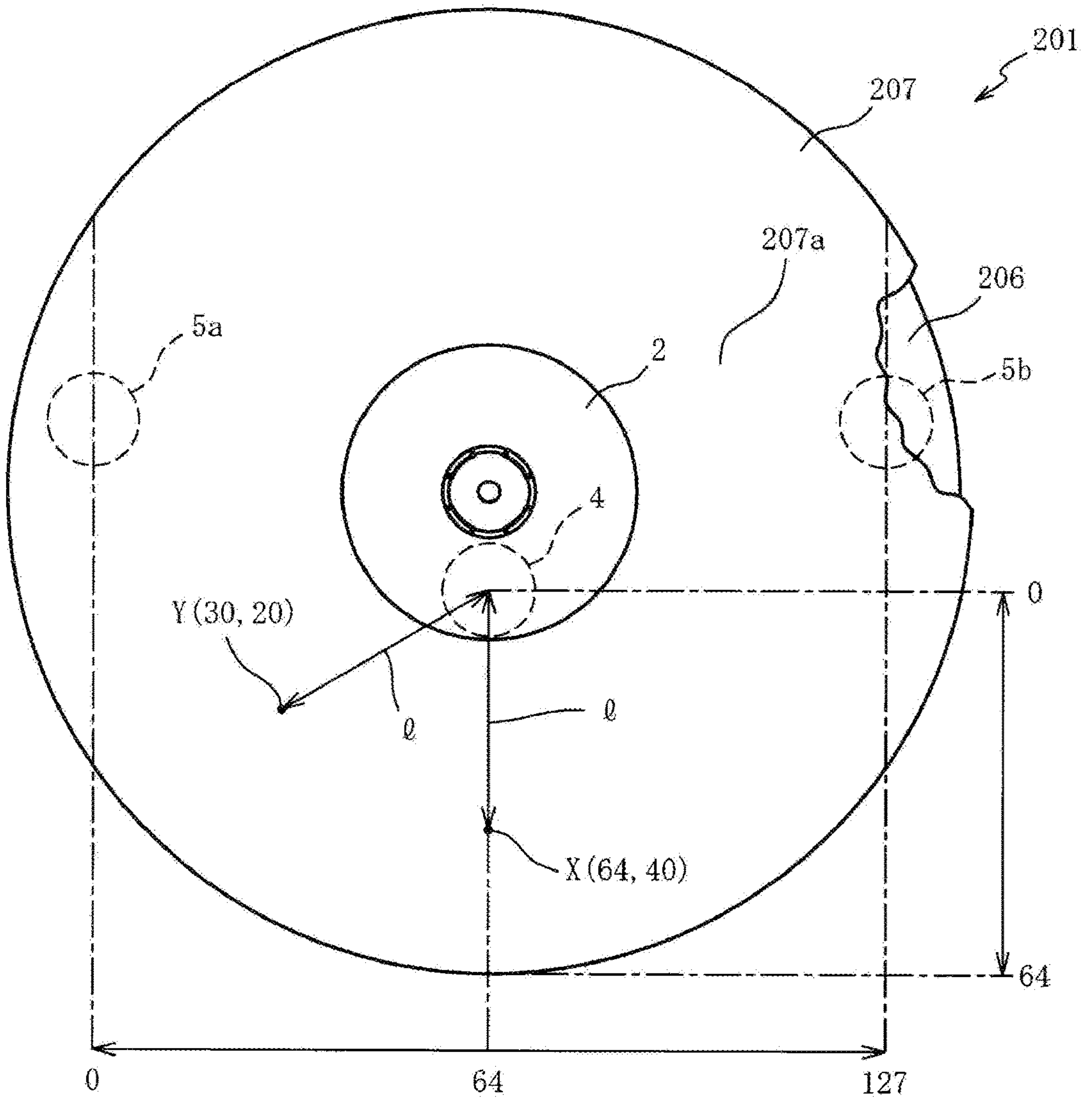
FIG. 10(*a*) is a top view of an electronic percussion instrument in a second embodiment, and FIG. 10(*b*) is a graph illustrating an example of a waveform which is output by a center sensor during percussion.
Figure 10B:
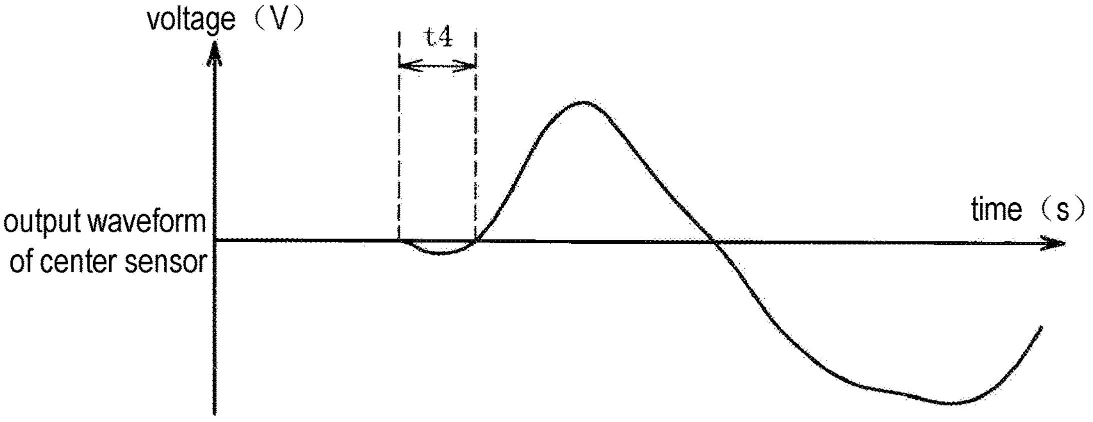

FIG. 10(*a*) is a top view of the electronic percussion instrument 201 in the second embodiment, and FIG. 10(*b*) is a graph illustrating an example of a waveform which is output by the center sensor 4 during percussion. Meanwhile, in FIG. 10(*b*), the vertical axis represents an output value (voltage) of the center sensor 4, and the horizontal axis represents time.

In addition, in the following description, similarly to the first embodiment, the direction of alignment of the first and second edge sensors 5*a* and 5*b* (a left-right direction in FIG. 10(*a*)) is defined as the left-right direction of the electronic percussion instrument 201, and a direction orthogonal to the left-right direction when seen in a top view (an up-down direction in FIG. 10(*a*)) is defined as a front-rear direction.

As shown in FIG. 10, the electronic percussion instrument 201 includes a substantially disc-shaped frame 206 and a rubber-made cover 207 that covers the upper surface of the frame 206 (the surface on the front side in the vertical direction of the page of FIG. 10(*a*)). Meanwhile, FIG. 10(*a*) shows a state in which a portion of the cover 207 is broken to expose the frame 206.

The center sensor 4 and the first and second edge sensors 5*a* and 5*b* are piezoelectric elements which are attached to the lower surface of the frame 206. That is, the center sensor 4 and the first and second edge sensors 5*a* and 5*b* have the same configurations as those in the first embodiment except that the cushion is omitted.

The upper surface of the cover 207 is a percussion surface 207*a*, and the center sensor 4 is disposed at a position which is slightly eccentric to the front side from the center of the percussion surface 207*a* (the axis of the electronic percussion instrument 201). The first and second edge sensors 5*a* and 5*b* are disposed closer to the edge side in the left-right direction of the percussion surface 207*a* than to the center sensor 4, and slightly closer to the rear side than to the center of the percussion surface 207*a* in the front-rear direction.

A vibration of percussion on the percussion surface 207*a* is detected by the center sensor 4 and the first and second edge sensors 5*a* and 5*b*, but the electrical configuration of the electronic percussion instrument 201 is substantially the same as that of the electronic percussion instrument 1 of the above-described first embodiment.

Thus, each sensor has the same function as that in the above-described first embodiment, in that the presence or absence of percussion is detected on the basis of the output value of the center sensor 4, the coordinates "0 to 127" of the percussion position in the left-right direction are calculated on the basis of the added-up value of the output values of the first and second edge sensors 5*a* and 5*b*, or the like. On the other hand, in the second embodiment, the coordinates "0 to 64" of the percussion position in the front-rear direction (the up-down direction in FIG. 10(*a*)) of the electronic percussion instrument 201 are calculated on the basis of the output value of the center sensor 4.

As shown in FIG. 10(*b*), a time t4 from a point in time of initial rise (fall) of an output waveform (output value) detected by the center sensor 4 to a time the output value is initially set to 0 after the percussion surface 207*a* is percussed is defined as an "initial half wave length." This initial half wave length t4 has characteristics that the length decreases as the percussion position becomes closer to the center sensor 4 and the length increases as the percussion position becomes farther from the center sensor 4.

Thus, by measuring this initial half wave length t4, it is possible to calculate a distance to the percussion position in a radial direction centering on the center sensor 4. In this case, an attempt to determine the percussion position of the percussion surface 207*a* in the front-rear direction on the basis of a distance from the center sensor 4 in a radial direction causes the following problems.

For example, as shown in FIG. 10(*a*), in a case where a percussion position X at the center of the percussion surface 207*a* in the left-right direction (a position where the coordinate in the left-right direction is "64") is percussed, the coordinate "40" of the percussion position in the front-rear direction of the percussion surface 207*a* can be acquired by using a distance 1 from the center sensor 4 to the percussion position X. Thus, in a case where the coordinates of the percussion position are indicated as (a coordinate value in the left-right direction, or a coordinate value in the front-rear direction), the coordinates of the percussion position X can be specified as (64, 40).

On the other hand, a percussion position shifted to the left side from the percussion position X (the center of the percussion surface 207*a* in the left-right direction) is defined as a percussion position Y. The coordinates of the percussion position Y are (30, 20), but the distance 1 from the center sensor 4 is almost the same as the percussion position X. In this case, when the distance 1 is set as the coordinates of the percussion position Y in the front-rear direction, the coordinates of the percussion position Y in the front-rear direction are calculated as "40."

Further, the above-described initial half wave length t4 is not a value which is perfectly proportional to a distance from the center sensor 4 to the percussion position, and has a tendency to increase as the percussion position moves away from the center sensor 4. Thus, when the coordinates of the percussion position in the front-rear direction are calculated on the basis of the initial half wave length t4, there is a problem in that coordinates larger than an actual percussion position have a tendency to be calculated (there is a tendency to determine that a position farther from the center sensor 4 than in reality in the front-rear direction is percussed).

Figure 11:
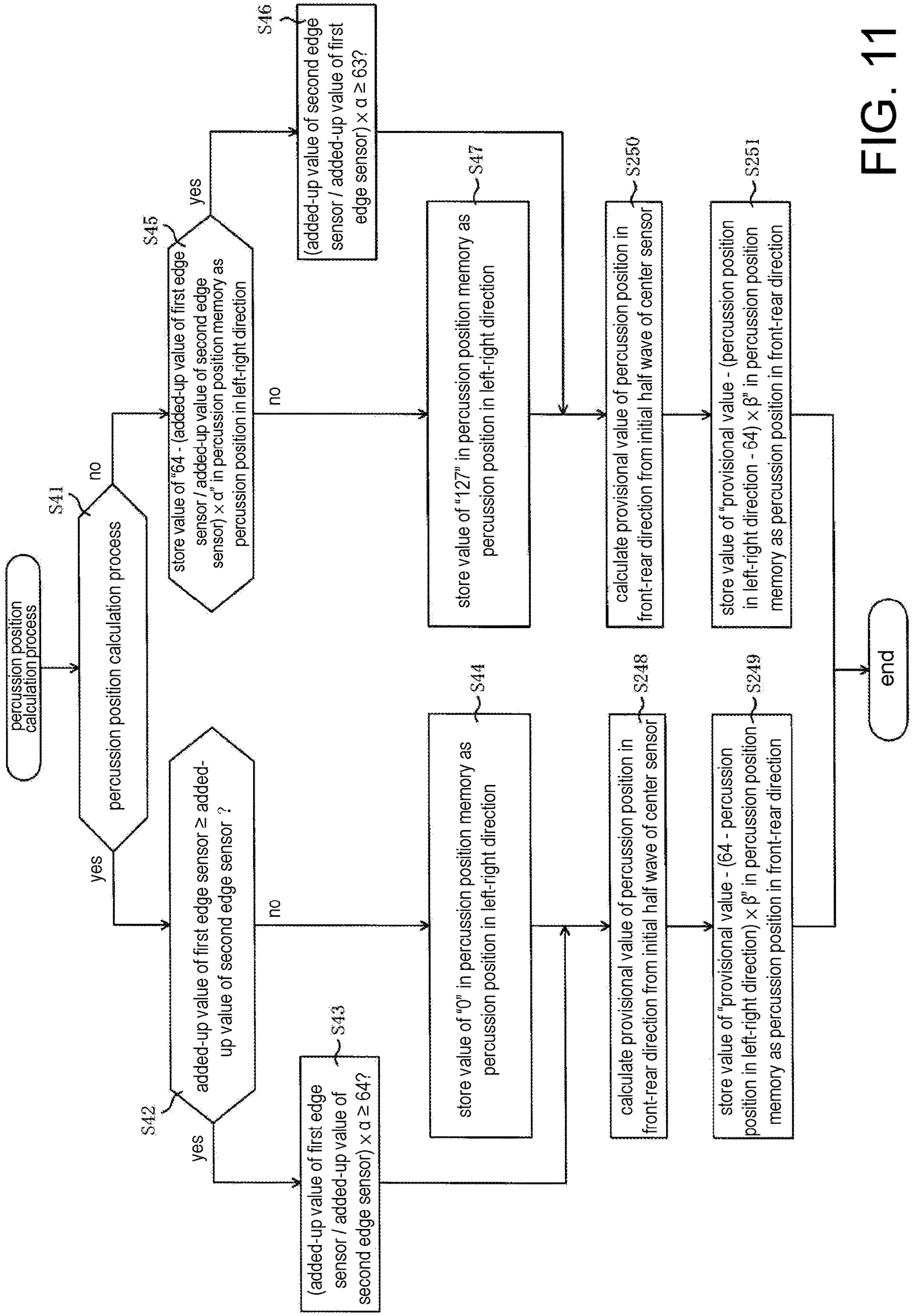
FIG. 11 is a flow chart illustrating a percussion position calculation process.

On the other hand, in the present embodiment, a configuration that makes it possible to solve such a problem is adopted. This configuration will be described further with reference to FIG. 11. FIG. 11 is a flow chart illustrating a percussion position calculation process.

As shown in FIG. 11, the percussion position calculation process in the second embodiment is the same as the percussion position calculation process (S40) of the above-described first embodiment, in the point of processes until the coordinates of the percussion position in a left-right direction are calculated on the basis of the added-up value of the output values of the first and second edge sensors 5*a* and 5*b* (processes of S41 to 47).

Thus, the coordinates "0 to 64" of the percussion position in the left-right direction are calculated through the processes of S43 and 44. Through the processes, for example, the percussion position X shown in FIG. 10(*a*) is calculated as a coordinate "64" in the left-right direction, and the percussion position Y is calculated as a coordinate "30" in the left-right direction.

After the processes of S43 and 44, the provisional value of the percussion position in the front-rear direction is calculated from the initial half wave length t4 of the center sensor 4 (S248). Through the process, "40" is calculated as the provisional value of the coordinates of the percussion positions X and Y shown in FIG. 10(*a*) in the front-rear direction. Thus, the coordinates of the provisional percussion positions X and Y at this point in time are (64, 40) for the percussion position X and are (30, 40) for the percussion position Y.

After the process of S248, the value of "provisional value−(64−percussion position in the left-right direction)×β" is stored in the percussion position memory 47 as the percussion position in the front-rear direction (S249). Through the process, for example, the provisional value of the coordinate of the percussion position X in the front-rear direction is "40," and the coordinate in the left-right direction is "64." Therefore, by calculating "40−(64−64)×β," the value of "40" is stored in the percussion position memory 47 as the coordinate of the percussion position X in the front-rear direction.

Meanwhile, the value of (64−percussion position in the left-right direction) is a value indicating a distance from the center sensor 4 in the left-right direction to the percussion position (a difference between the coordinates of the center sensor 4 and the percussion position in the left-right direction).

On the other hand, since the provisional value of the coordinate of the percussion position Y in the front-rear direction is "40" and the coordinate in the left-right direction is "30," the calculation of "40−(64−30)×β" is 40−34β. Since the value of β is set so that the calculation result approaches "20" which is an actual coordinate, the value of "20" is stored in the percussion position memory 47 as the coordinate of the percussion position Y in the front-rear direction.

In this manner, by calculating the coordinates of the percussion position in the front-rear direction on the basis of the initial half wave length t4 detected by the center sensor 4, the percussion position on the percussion surface 207*a* can be specified by two-dimensional coordinates in the left-right direction and the front-rear direction. That is, it is possible to detect the absolute position of the percussion position on the percussion surface 207*a*.

In addition, the provisional value of the percussion position in the front-rear direction is calculated on the basis of the output value of the center sensor 4 (the initial half wave length t4), and the percussion position in the front-rear direction is calculated by correcting the provisional value on the basis of the percussion position in the left-right direction. That is, the two-dimensional coordinates of the percussion position are specified on the basis of the output values of three sensors, that is, the output value of one the center sensor 4 and the output values (added-up values) of the two first and second edge sensors 5*a* and 5*b*. Thus, it is possible to reduce the product cost of the electronic percussion instrument 201 more than in a case where the two-dimensional coordinates of the percussion position are specified using, for example, four or more sensors.

On the other hand, similarly, in a case where the right side of the percussion surface 207*a* is percussed rather than the center thereof, the provisional value of the percussion position in a front-rear direction is calculated from the initial half wave length t4 of the center sensor 4 after the processes of S46 and 47 (S250).

After the process of S250, the value of "provisional value−(percussion position in the left-right direction−64)×β" is stored in the percussion position memory 47 as the percussion position in the front-rear direction (S251). Similarly to S249 described above, the value of (percussion position in the left-right direction−64) is a value indicating a distance from the center sensor 4 in the left-right direction to the percussion position (a difference between the coordinates of the center sensor 4 and the percussion position in the left-right direction). Through the processes of S250 and 251, even in a case where the right side of the percussion surface 207*a* is percussed rather than the center thereof, the same correction as the above-described the percussion position Y is performed.

In this manner, in the present embodiment, the coordinates of the percussion position in the left-right direction are calculated on the basis of the added-up value of the output values of the first and second edge sensors 5*a* and 5*b*, and the coordinates of the percussion position in the front-rear direction are corrected on the basis of the output values of the first and second edge sensors 5*a* and 5*b*. Thus, it is possible to calculate the percussion positions in the left-right direction and the front-rear direction more accurately than in a case where the calculation and correction are performed using the peak values of the first and second edge sensors 5*a* and 5*b*.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents. For example, numerical values such as the coordinates and the set values (frequency, Q value, and Gain) of the equalizer given in each of the embodiments are examples and can be appropriately set.

In each of the embodiments, a case where the electronic percussion instrument 1 of the first embodiment is an electronic drum and the electronic percussion instrument 201 of the second embodiment is an electronic cymbal has been described, but the disclosure is not necessarily limited thereto. For example, the configuration of the first embodiment (configuration for dividing the percussion surface) may be applied to an electronic cymbal, and the configuration of the second embodiment (configuration for calculating the two-dimensional coordinates of the percussion position) may be applied to an electronic drum. That is, the technical idea of the above-described first and second embodiments can be applied to other electronic percussion instruments insofar as the percussion position of the percussion surface is detected.

In each of the embodiments, a case where percussion on the percussion surfaces 3*a* and 207*a* is detected and then the output values of the first and second edge sensors 5*a* and 5*b* are added up back in a predetermined time has been described, but the disclosure is not necessarily limited thereto. For example, the output values of the first and second edge sensors 5*a* and 5*b* may be added up immediately after percussion on the percussion surfaces 3*a* and 207*a* is detected.

In each of the embodiments, a case where the presence or absence of percussion is determined by the center sensor 4 has been described, but the disclosure is not necessarily limited thereto. For example, the presence or absence of percussion may be detected using either or both of the first and second edge sensors 5*a* and 5*b*, or all of the center sensor 4 and the first and second edge sensors 5*a* and 5*b*. Particularly, as in the first embodiment, in a case where the percussion position only in the direction of alignment of the first and second edge sensors 5*a* and 5*b* (first and second sensors) is detected, the presence or absence of percussion may be detected using the first and second edge sensors 5*a* and 5*b*, and the center sensor 4 may be omitted.

In each of the embodiments, a case where the percussion position in the left-right direction is detected by two sensors of the first and second edge sensors 5*a* and 5*b* has been described, but the disclosure is not necessarily limited thereto. For example, three or more sensors having a configuration equivalent to the edge sensor may be provided, and the percussion position in the direction of alignment of the three or more sensors may be detected.

In each of the embodiments, a case where the percussion position in the left-right direction is calculated on the basis of the ratio between the added-up values (at the added-up value calculation process at a second time or more than the second time) of the output values of the first and second edge sensors 5*a* and 5*b* has been described, but the disclosure is not necessarily limited thereto. For example, the percussion position in the left-right direction may be calculated on the basis of a difference between the added-up values (at the added-up value calculation process at a second time or more than the second time) of the output values of the first and second edge sensors 5*a* and 5*b*.

In each of the embodiments, a case where the temporal length of the storage region of the ring buffer 41 is set to the same length as the adding-up time t1 has been described, but the disclosure is not necessarily limited thereto. For example, the temporal length of the storage region of the ring buffer 41 may be set to be longer than the adding-up time t1.

In the first embodiment, a case where the division mode of the percussion surface 3*a* is changed in accordance with the interval of percussion has been described, but the disclosure is not necessarily limited thereto. For example, the division mode of the percussion surface 3*a* may be changed using other parameters (such as, for example, percussion force or the amount of change in the percussion position). In addition, although 167 msec is exemplified as a threshold of the interval of percussion when the division mode of the percussion surface 3*a* is changed, it may be set to a threshold equal to or greater than 167 msec or less than 167 msec.

In the first embodiment, a case where the percussion surface 3*a* is divided into five regions of the regions L2, L1, C, R1, and R2 or two regions of the regions L and R has been described, but the disclosure is not necessarily limited thereto. For example, the percussion surface 3*a* may not be divided. In a case where the percussion surface 3*a* is not divided, only a single musical sound may be generated, or a musical sound having a waveform (sound quality) that differs depending on a difference in the interval of percussion may be generated. In addition, 2 to 4 or six or more divided regions may be formed in the first mode, or three or more divided regions may be formed in the second mode. In addition, a third mode in which the percussion surface 3*a* is not divided may be provided, and the first to third modes may be switched in accordance with the interval of percussion on the percussion surface 3*a*.

In the first embodiment, a case where the quality of a musical sound is not changed in the region C of the first mode has been described, but the disclosure is not necessarily limited thereto. For example, the quality of a musical sound may be changed in the region C. That is, in a case where there is a plurality of divided regions, the quality of a musical sound may be changed only in a portion of the regions, or the quality of the musical sound may be changed in all the regions.

In the first embodiment, a case where the quality of a musical sound is not changed in the regions L and R of the second mode has been described, but the disclosure is not necessarily limited thereto. For example, the quality of the musical sound may be changed in either or both of the regions L and R.

In the second embodiment, a case where the percussion surface 207*a* is not divided has been described, but the disclosure is not necessarily limited thereto. For example, similarly to the first embodiment, the percussion surface 207*a* may be divided into a plurality of divided regions. In this case, in the second embodiment, since the two-dimensional coordinates of the percussion position are calculated by the center sensor 4 and the first and second edge sensors 5*a* and 5*b*, the percussion surface 207*a* may be divided in the left-right direction and the front-rear direction (in a lattice shape), and a musical sound having a waveform (sound quality) that differs depending on the divided region may be generated.

In addition, a mode in which the percussion surface 207*a* is divided only in the left-right direction, a mode in which the percussion surface is divided only in the front-rear direction, and a mode in which the percussion surface is divided in the left-right direction and the front-rear direction may be switched depending on a difference in the interval of percussion.

In the second embodiment, a case where the provisional value of the percussion position in the front-rear direction of the percussion surface 207*a* is corrected on the basis of the added-up value of the output values of the first and second edge sensors 5*a* and 5*b* (the percussion position in the left-right direction) has been described, but the disclosure is not necessarily limited thereto. For example, the provisional value of the percussion position in the front-rear direction of the percussion surface 207*a* may be corrected using other correction coefficients.

What is claimed is:

1. An electronic percussion instrument comprising:

a percussion surface;

a first sensor, a second sensor and a third sensor that detect a vibration of percussion on the percussion surface;

a first calculation unit that calculates a percussion position in a first direction which is a direction of alignment of the first sensor and the second sensor on the basis of a ratio or difference between an added-up value of output values of the first sensor within a predetermined time after the percussion surface is percussed and an added-up value of output values of the second sensor within the predetermined time;

a first determination unit that determines presence or absence of the percussion on the percussion surface on the basis of an output value of the third sensor;

virtual divided regions formed on the percussion surface, being a plurality of divided regions lined up in the first direction between the first sensor and the second sensor;

a second determination unit that determines which of the plurality of divided regions is percussed on the basis of the percussion position in the first direction; and an instruction unit that performs an instruction for generation of musical sounds that vary depending on the plurality of divided regions or an instruction for a change of qualities of the musical sounds on the basis of a determination result of the second determination unit, wherein the third sensor is disposed closer to a center of the percussion surface than to the first sensor and the second sensor, wherein a starting point of the predetermined time is set to a point in time before a point in time when the first determination unit determines the presence of the percussion on the percussion surface, and the electronic percussion instrument is configured to capable of switching between the following two modes:

a first mode in which the divided regions are formed in at least three regions of a first region formed at a center of the percussion surface, a second region formed closer to the first sensor than to the first region, and a third region formed closer to the second sensor than to the first region; and a second mode in which the divided regions are formed in at least two regions of a fourth region formed on the first sensor side with the center of the percussion surface as a boundary and a fifth region formed on the second sensor side with the center of the percussion surface as a boundary, wherein the first mode is set in a case where an interval of the percussion on the percussion surface is equal to or greater than a predetermined value, and the second mode is set in a case where the interval of percussion is less than the predetermined value.

2. The electronic percussion instrument according to claim 1, further comprising a second calculation unit that calculates a percussion position in a second direction orthogonal to the first direction on the basis of a length of an initial half wave detected by the third sensor after the first determination unit determines the presence of the percussion on the percussion surface.

3. The electronic percussion instrument according to claim 2, wherein the second calculation unit corrects and calculates the percussion position in the second direction on the basis of the percussion position in the first direction.

4. The electronic percussion instrument according to claim 3, wherein the second calculation unit calculates a provisional value of the percussion position in the second direction on the basis of the length of the initial half wave, and calculates the percussion position in the second direction by subtracting a value based on the percussion position in the first direction from the provisional value.

5. The electronic percussion instrument according to claim 1, further comprising:

a ring buffer in which the output values of the first sensor and the second sensor are stored for an amount of a predetermined storage time so as to be updated in a time-series manner; and an added-up value calculation unit that calculates a sum of the output values of the first sensor and a sum of the output values of the second sensor which are stored in the ring buffer each time the ring buffer is updated, wherein the predetermined storage time and the predetermined time are set to have the same length.

6. The electronic percussion instrument according to claim 1, wherein a formation mode for the divided regions is changed on the basis of a change in the interval of the percussion on the percussion surface.

7. The electronic percussion instrument according to claim 1, wherein the first calculation unit calculates a coordinate of the percussion position in the first direction on the basis of a magnitude of a ratio or difference between the added-up value of the output values of the first sensor and the added-up value of the output values of the second sensor.

8. An electronic percussion instrument comprising:

a percussion surface;

a first sensor and a second sensor that detect a vibration of percussion on the percussion surface, and a third sensor disposed closer to a center of the percussion surface than to the first sensor and the second sensor;

a first calculation unit that calculates a percussion position in a first direction which is a direction of alignment of the first sensor and the second sensor on the basis of a ratio or difference between an added-up value of output values of the first sensor within a predetermined time after the percussion surface is percussed and an added-up value of output values of the second sensor within the predetermined time;

a first determination unit that determines presence or absence of the percussion on the percussion surface on the basis of an output value of the third sensor, wherein a starting point of the predetermined time is set to a point in time before a point in time when the first determination unit determines the presence of the percussion on the percussion surface; and a second calculation unit that calculates a percussion position in a second direction orthogonal to the first direction on the basis of a length of an initial half wave detected by the third sensor after the first determination unit determines the presence of the percussion on the percussion surface;

virtual divided regions formed on the percussion surface, being a plurality of divided regions lined up in the first direction between the first sensor and the second sensor;

a second determination unit that determines which of the plurality of divided regions is percussed on the basis of the percussion position in the first direction; and an instruction unit that performs an instruction for generation of musical sounds that vary depending on the plurality of divided regions or an instruction for a change of qualities of the musical sounds on the basis of a determination result of the second determination unit, wherein the electronic percussion instrument is configured to be capable of switching between the following two modes:

a first mode in which the divided regions are formed in at least three regions of a first region formed at a center of the percussion surface, a second region formed closer to the first sensor than to the first region, and a third region formed closer to the second sensor than to the first region; and a second mode in which the divided regions are formed in at least two regions of a fourth region formed on the first sensor side with the center of the percussion surface as a boundary and a fifth region formed on the second sensor side with the center of the percussion surface as a boundary, wherein the first mode is set in a case where an interval of the percussion on the percussion surface is equal to or greater than a predetermined value, and the second mode is set in a case where the interval of percussion is less than the predetermined value.

9. The electronic percussion instrument according to claim 8, wherein the second calculation unit corrects and calculates the percussion position in the second direction on the basis of the percussion position in the first direction.

10. The electronic percussion instrument according to claim 9, wherein the second calculation unit calculates a provisional value of the percussion position in the second direction on the basis of the length of the initial half wave, and calculates the percussion position in the second direction by subtracting a value based on the percussion position in the first direction from the provisional value.

11. The electronic percussion instrument according to claim 9, further comprising:

a ring buffer in which the output values of the first sensor and the second sensor are stored for an amount of a predetermined storage time so as to be updated in a time-series manner; and an added-up value calculation unit that calculates a sum of the output values of the first sensor and a sum of the output values of the second sensor which are stored in the ring buffer each time the ring buffer is updated, wherein the predetermined storage time and the predetermined time are set to have the same length.

12. A method of detecting a percussion position in an electronic percussion instrument including a percussion surface and a first sensor, a second sensor and a third sensor that detect a vibration of percussion on the percussion surface, the method comprising:

calculating a percussion position in a first direction which is a direction of alignment of the first sensor and the second sensor on the basis of a ratio or difference between an added-up value of output values of the first sensor within a predetermined time after the percussion surface is percussed and an added-up value of output values of the second sensor within the predetermined time;

determining presence or absence of the percussion on the percussion surface on the basis of an output value of the third sensor, wherein the third sensor is disposed closer to a center of the percussion surface than to the first sensor and the second sensor;

dividing the percussion surface into virtual divided regions being a plurality of divided regions lined up in the first direction between the first sensor and the second sensor;

determining which of the plurality of divided regions is percussed on the basis of the percussion position in the first direction; and performing an instruction for generation of musical sounds that vary depending on the plurality of divided regions or an instruction for a change of qualities of the musical sounds on the basis of a determination result of which of the plurality of divided regions is percussed, wherein a starting point of the predetermined time is set to a point in time before a point in time when the presence of the percussion is determined on the percussion surface, and wherein the dividing of the percussion surface into virtual divided regions comprises the following two modes:

a first mode in which the divided regions are formed in at least three regions of a first region formed at a center of the percussion surface, a second region formed closer to the first sensor than to the first region, and a third region formed closer to the second sensor than to the first region; and a second mode in which the divided regions are formed in at least two regions of a fourth region formed on the first sensor side with the center of the percussion surface as a boundary and a fifth region formed on the second sensor side with the center of the percussion surface as a boundary, wherein the first mode is set in a case where an interval of the percussion on the percussion surface is equal to or greater than a predetermined value, and the second mode is set in a case where the interval of percussion is less than the predetermined value.

13. The method of detecting a percussion position according to claim 12, further comprising calculating a coordinate of the percussion position in the first direction on the basis of a magnitude of a ratio or difference between the added-up value of the output values of the first sensor and the added-up value of the output values of the second sensor.

* * * * *